(12) United States Patent
Harakawa

(10) Patent No.: US 10,186,934 B2
(45) Date of Patent: Jan. 22, 2019

(54) ELECTRIC POWER SUPPLY SYSTEM

(71) Applicant: ExH Corporation, Chiba (JP)

(72) Inventor: Kenichi Harakawa, Chiba (JP)

(73) Assignee: EXH Corporation, Chiba (JP)

( * ) Notice: Subject to any disclaimer, the term of this patent is extended or adjusted under 35 U.S.C. 154(b) by 191 days.

(21) Appl. No.: 15/326,862

(22) PCT Filed: Jul. 17, 2015

(86) PCT No.: PCT/JP2015/070576
§ 371 (c)(1),
(2) Date: Jan. 17, 2017

(87) PCT Pub. No.: WO2016/010145
PCT Pub. Date: Jan. 21, 2016

(65) Prior Publication Data
US 2017/0214296 A1 Jul. 27, 2017

(30) Foreign Application Priority Data

Jul. 17, 2014 (JP) ................................. 2014-147203

(51) Int. Cl.
*H02K 11/22* (2016.01)
*H02K 11/33* (2016.01)
(Continued)

(52) U.S. Cl.
CPC ........... *H02K 11/022* (2013.01); *H01R 39/64* (2013.01); *H02K 11/028* (2013.01); *H02K 11/33* (2016.01); *H01R 39/54* (2013.01)

(58) Field of Classification Search
CPC .... H02K 11/022; H02K 11/028; H02K 11/33; H01R 39/00; H01R 39/54; H01R 39/64; H05K 9/00
(Continued)

(56) References Cited

U.S. PATENT DOCUMENTS

| 2,422,961 A * | 6/1947 | Hallstrand | H01R 39/00 |
| | | | 174/21 JC |
| 7,554,230 B2 * | 6/2009 | Kitagawa | H02K 5/225 |
| | | | 310/64 |

(Continued)

FOREIGN PATENT DOCUMENTS

| JP | H04-061784 | 5/1992 |
| JP | H06-282801 A | 10/1994 |

(Continued)

*Primary Examiner* — Alex W Mok
(74) *Attorney, Agent, or Firm* — Muncy, Geissler, Olds & Lowe, P.C.

(57) ABSTRACT

The purpose of the present invention is to provide an electric power supply system that is superior to conventional systems.

This electric power supply system has a configuration in which: a fixed member 8 is provided with an inner conductor 9 arranged along the axial direction of the fixed member 8, an outer conductor 13 arranged along the axial direction of the fixed member 8 so as to cover the inner conductor 9, and a high-frequency conductive path dielectric 5 disposed between the inner conductor 9 and the outer conductor 13; a rotating member 7 is provided with an inner conductor 9 arranged along the axial direction of the rotating member 7, an outer conductor 13 arranged along the axial direction of the rotating member 7 so as to cover the inner conductor 9, and a high-frequency conductive path dielectric 5 disposed between the inner conductor 9 and the outer conductor 13; a high-frequency electric power source 27, the outer conductor 13 of the fixed member 8, the outer conductor 13 of the rotating member 7 and a load 26 are electrically connected so that it is possible to supply electric power from the high-frequency electric power source 27 to the load 26; and the fixed member 8 and the rotating member 7 are combined to form an electromagnetic wave attenuation structure for attenuating the electromagnetic waves emitted from the electric power supply system.

3 Claims, 29 Drawing Sheets

(51) Int. Cl.
*H02K 11/028* (2016.01)
*H01R 39/64* (2006.01)
*H01R 39/54* (2006.01)

(58) Field of Classification Search
USPC .......................................................... 310/89
See application file for complete search history.

(56) References Cited

U.S. PATENT DOCUMENTS

| | | | | |
|---|---|---|---|---|
| 7,637,744 | B2* | 12/2009 | Singer | H01R 39/643 |
| | | | | 439/13 |
| 8,445,782 | B2* | 5/2013 | Jaffari | F16L 25/01 |
| | | | | 174/84 R |
| 2009/0239391 | A1 | 9/2009 | Singer | |
| 2015/0054373 | A1* | 2/2015 | Mane | H02K 31/02 |
| | | | | 310/156.37 |

FOREIGN PATENT DOCUMENTS

| | | | | |
|---|---|---|---|---|
| JP | 2009-231290 A | 10/2009 | | |
| JP | 2011-019293 A | 1/2011 | | |
| JP | 2013-258635 A | 12/2013 | | |
| JP | 2014-110664 A | 6/2014 | | |
| JP | 2017160772 A | * | 9/2017 | ............ E05F 15/622 |

* cited by examiner

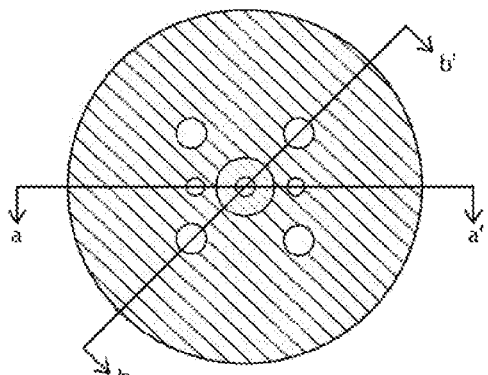
FIG. 7 (a) Top Plate
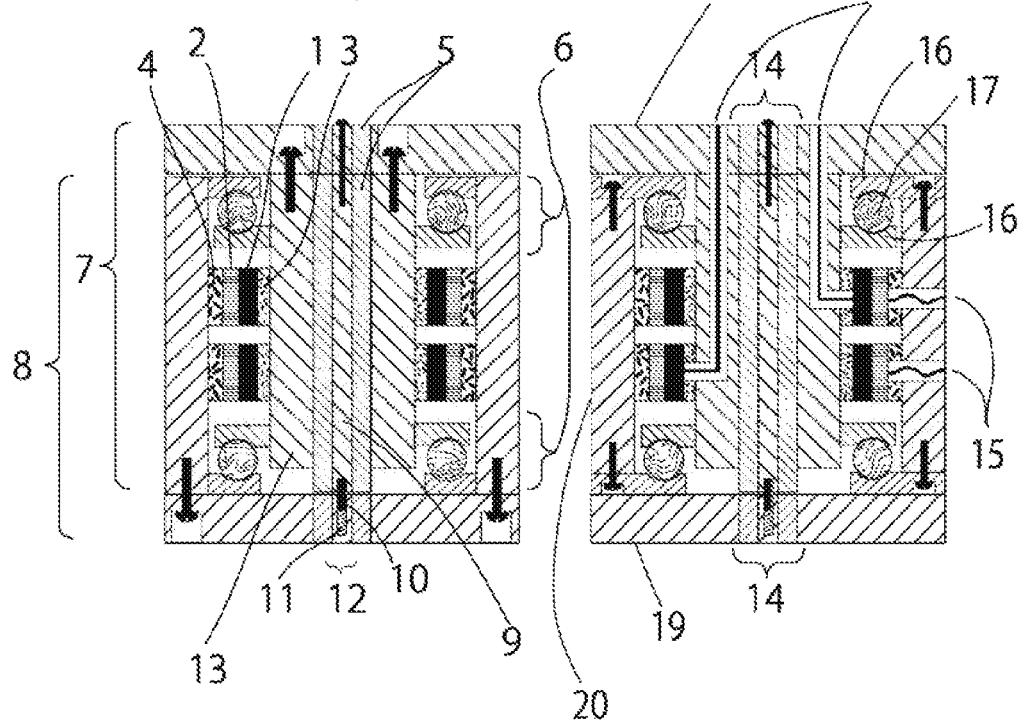
FIG. 7(b) b-b' Cross Section    FIG. 7(c) a-a' Cross Section

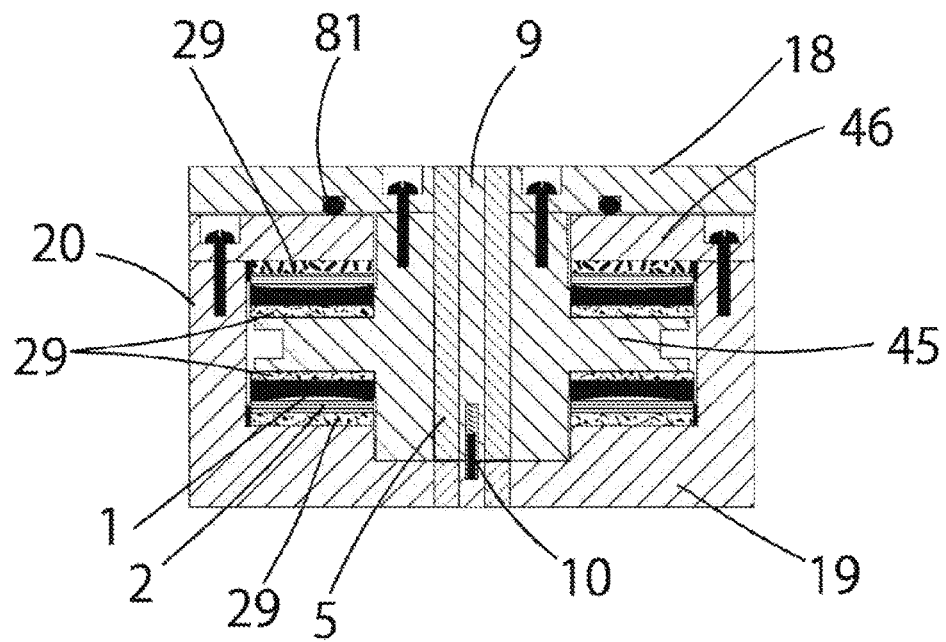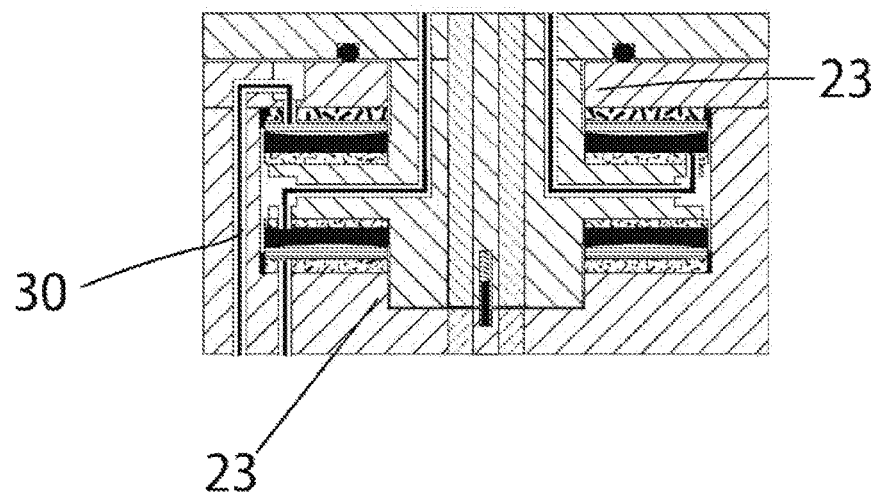
FIG. 19

ELECTRIC POWER SUPPLY SYSTEM

TECHNICAL FIELD

The present invention relates to an electric power supply system.

BACKGROUND ART

In general, electric power supply systems that supply electric power to a load provided in a rotating member that is rotatable in relation to a fixed member can be broadly classified into a contact-type electric power supply system in which an electrode is brought into contact from outside with an electrode provided in a rotating member in an exposed manner to supply electric power to the electrode and a non-contact-type electric power supply system in which electric power is supplied to an electrode provided in a rotating member in a non-exposed manner without making contact with the electrode.

Among these electric power supply systems, a conventional contact-type electric power supply system is disclosed in Patent Document 1, for example. In this system, an electrode called a slip ring is provided in a rotating member, an electrode called a brush is provided outside the rotating member, and the slip ring and the brush make sliding-contact with each other whereby electric power is transmitted.

Patent Document 1: Japanese Unexamined Patent Application, Publication No. H06-282801

DISCLOSURE OF THE INVENTION

Problems to be Solved by the Invention

However, the conventional system has the following problems.

(1) Since a conductive collector ring and a conductive brush or the like make contact with each other, conductive wear particles are generated. Due to this, it is necessary to frequently perform maintenance (removal of waste).

(2) The collector ring and the brush are both conductive materials and electric power can be transmitted by bringing into contact with each other. Due to this, when the system is wet with water, the film of water enter into the space between the collector ring and the brush particularly when the rotating member rotates at high speed, and power transmission efficiency decreases.

(3) Since the collector ring and the brush are exposed, when the slip ring is used in an acid or alkali environment, and acid or alkali liquid or gas touches the collector ring or the brush, corrosion may occur.

(4) When a structure which prevents water or gas from entering into the slip ring is employed, high mechanical accuracy is required and the manufacturing cost increases. However, even when a high-quality rubber packing is inserted into a rolling bearing portion, it is not possible to block water or gas completely. Furthermore, there is another problem that the friction against rotation increases.

In view of the foregoing, an object of the present invention is to provide an electric power supply system that is superior to existing systems.

Means for Solving the Problems

In order to solve the problems and attain the object, an electric power supply system according to claim 1 is an electric power supply system that supplies electric power from an electric power source to a predetermined load via a first shaft and a second shaft that is rotatable in relation to the first shaft, wherein the first shaft includes: a first inner shaft conductor disposed along an axial direction of the first shaft; a first outer shaft conductor disposed so as to cover the first inner shaft conductor along the axial direction of the first shaft; and a first shaft insulator disposed between the first inner shaft conductor and the first outer shaft conductor, the second shaft includes: a second inner shaft conductor disposed along an axial direction of the second shaft; a second outer shaft conductor disposed so as to cover the second inner shaft conductor along the axial direction of the second shaft; and a second shaft insulator disposed between the second inner shaft conductor and the second outer shaft conductor, the electric power source, the first outer shaft conductor, the second outer shaft conductor, and the load are electrically connected so that electric power can be supplied from the electric power source to the load, and the first shaft and the second shaft are combined to form an electromagnetic wave attenuation structure for reducing electromagnetic waves radiating from the electric power supply system.

An electric power supply system according to claim 2 is the electric power supply system according to claim 1, in which the electromagnetic wave attenuation structure is formed as a cover structure in which at least a portion of the second outer shaft conductor is covered by the first outer shaft conductor so that portions to which the first outer shaft conductor and the second outer shaft conductor are electrically connected are not exposed to the outside.

An electric power supply system according to claim 3 is the electric power supply system according to claim 1, in which the electromagnetic wave attenuation structure is formed as a contact structure in which the first outer shaft conductor and the second outer shaft conductor make contact with each other so that a conductive property of the first outer shaft conductor and the second outer shaft conductor can be secured.

Effects of the Invention

According to the electric power supply system of claim 1, the first shaft includes the first inner shaft conductor disposed along the axial direction of the first shaft, the first outer shaft conductor disposed so as to cover the first inner shaft conductor along the axial direction of the first shaft, and the first shaft insulator disposed between the first inner shaft conductor and the first outer shaft conductor, the second shaft includes the second inner shaft conductor disposed along the axial direction of the second shaft, the second outer shaft conductor disposed so as to cover the second inner shaft conductor along the axial direction of the second shaft, and the second shaft insulator disposed between the second inner shaft conductor and the second outer shaft conductor, and the electric power source, the first outer shaft conductor, the second outer shaft conductor, and the load are electrically connected so that electric power can be supplied from the electric power source to the load. Therefore, when electric field coupling is realized by the first inner shaft conductor and the second inner shaft conductor, the effects to be described below are obtained. Specifically, since the first inner shaft conductor and the second inner shaft conductor do not make contact with each other, the maintenance of the first inner shaft conductor and the second inner shaft conductor is not necessary or a maintenance interval can be extended. Moreover, even when water enters into the first shaft or the second shaft, the first inner shaft conductor and the second inner shaft conductor can be used without any problem (particularly, since water is a ferroelectric material having a relative dielectric constant of 80, it is possible to strengthen the coupling force by electric field). Therefore, since a design which allows entrance of water can be provided, the manufacturing cost can be reduced. Moreover, a decrease in power transmission efficiency can be suppressed even when the second shaft rotates at a high speed. Furthermore, since the first inner shaft conductor is covered by the first shaft insulator and the second inner shaft conductor is covered by the second shaft insulator, it is possible to prevent deterioration of the first inner shaft conductor and the second inner shaft conductor as long as these shaft insulators have acid and alkali resistance. Furthermore, since the first shaft and the second shaft are combined to form the electromagnetic wave attenuation structure for reducing the electromagnetic waves radiating from the electric power supply system, it is possible to reduce the electromagnetic waves radiating from the electric power supply system toward the outside and to improve the safety.

According to the electric power supply system of claim 2, the electromagnetic wave attenuation structure is formed as the cover structure in which at least a portion of the second outer shaft conductor is covered by the first outer shaft conductor so that portions to which the first outer shaft conductor and the second outer shaft conductor are electrically connected are not exposed to the outside. Therefore, it is possible to form the cover structure easily and to improve the manufacturing property and to further reduce the manufacturing cost.

According to the electric power supply system of claim 3, the electromagnetic wave attenuation structure is formed as the contact structure in which the first outer shaft conductor and the second outer shaft conductor make contact with each other so that a conductive property of the first outer shaft conductor and the second outer shaft conductor can be secured. Therefore, it is possible to form the contact structure easily and to improve the manufacturing property and to further reduce the manufacturing cost.

BRIEF DESCRIPTION OF THE DRAWINGS

FIGS. 7A to 7C are cross-sectional views illustrating a configuration of an electric power supply system which uses independent electrodes.

FIG. 19 is a cross-sectional view illustrating a configuration of an electric power supply system which uses independent electrodes.

PREFERRED MODE FOR CARRYING OUT THE INVENTION

Hereinafter, embodiments of an electric power supply system according to the present invention will be described in detail with reference to the drawings in the following order:
(1) Basic concept of electric power supply system; (2) Configuration of electric power supply system which uses shielding structure; (3) Configuration of electric power supply system which uses independent electrode; and Modification for the Embodiments. Note that the present invention is not limited to these embodiments.

(1) Basic Concept of Electric Power Supply System

First, a basic concept of an electric power supply system according to an embodiment of the present invention will be described. An electric power supply system according to the present embodiment is an electric power supply system for supplying electric power to a prescribed load provided in a rotating member that rotates in relation to a electric power source (or a movable member or the like that moves in relation to a electric power source). An application target of this electric power supply system is arbitrary and can be applied in order to supply electric power to a rotating member via a rotating connection portion which includes a shaft and a bearing, for example, when supplying electric power to an arm of an industrial robot, when supplying electric power to a monitoring camera that performs a swing operation, or when supplying electric power to a rotating portion of a tower crane.

(Principle of Electric Power Supply System)

Next, the principle of an electric power supply system according to the present embodiment, found by the present inventor will be described.

Figure 1:
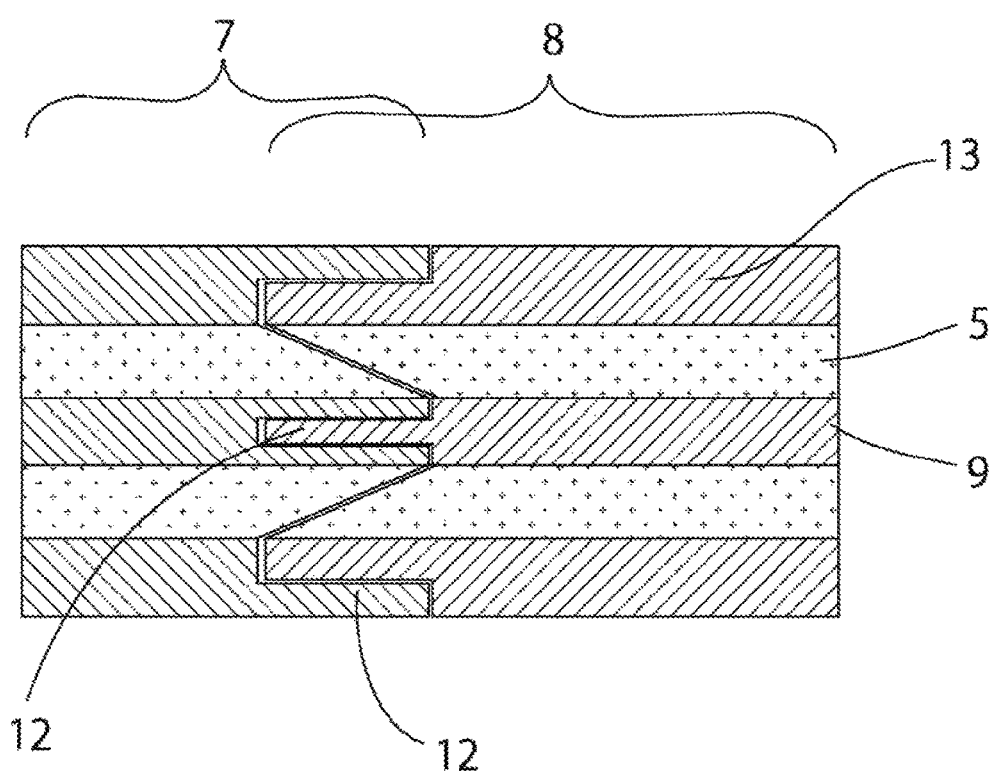
FIG. 1 is a cross-sectional view illustrating a configuration of an electric power supply system that performs power transmission and communication.
Figure 2:
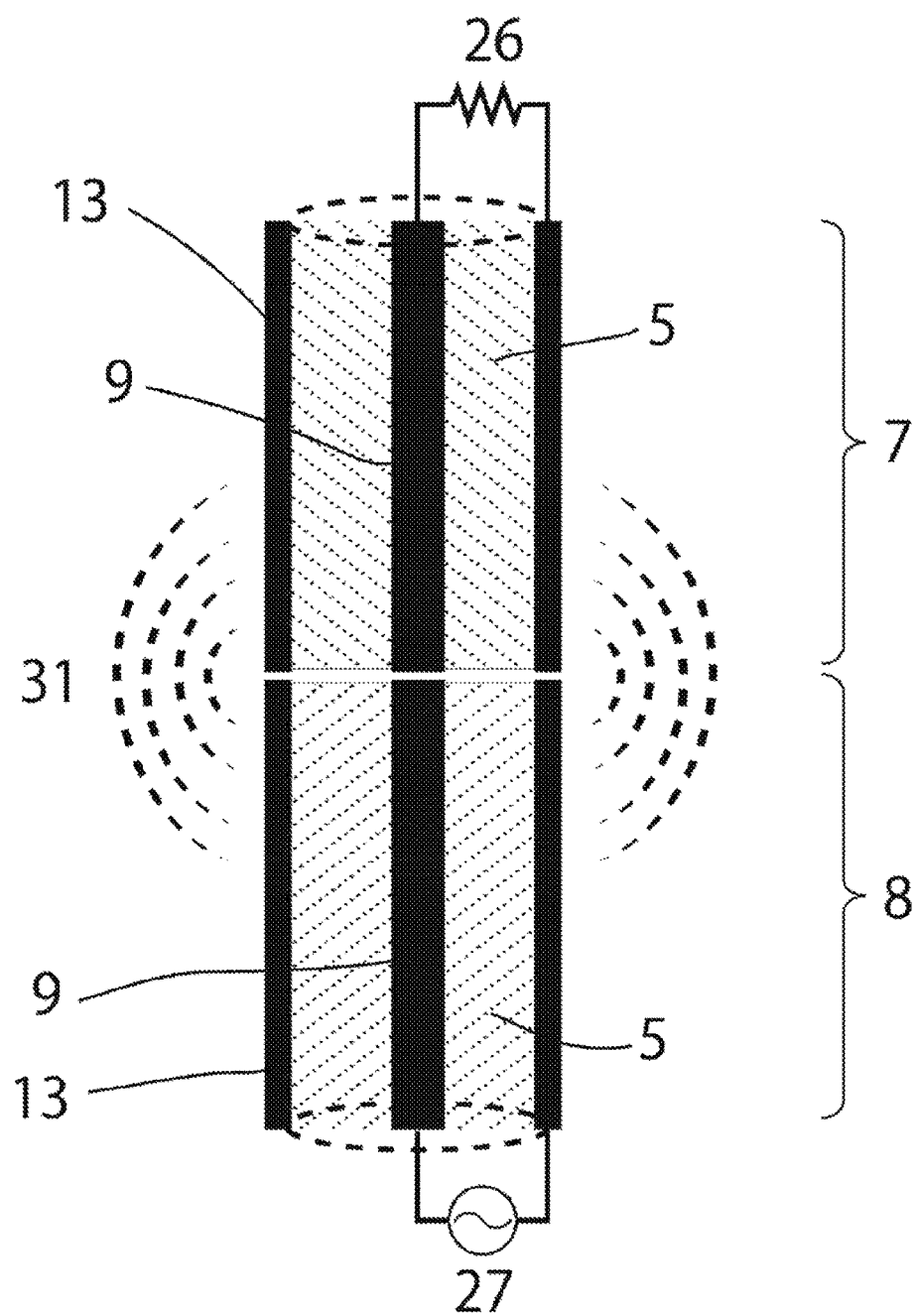
FIG. 2 is a side view illustrating a state in which electromagnetic waves radiate from an electric power supply system.

FIG. 1 is a cross-sectional view illustrating a configuration of an electric power supply system that performs power transmission and communication. FIG. 2 is a side view illustrating a state in which electromagnetic waves radiate from an electric power supply system. As illustrated in FIGS. 1 and 2, an electric power supply system includes a fixed member 8 (a first shaft) which is a transmission-side shaft and is fixed to be non-rotatable and a rotating member 7 (a second shaft) which is a reception-side shaft and is rotatable in relation to the fixed member 8. In this electric power supply system, a bearing (not illustrated) for supporting the fixed member 8 is provided at a right end of the fixed member 8, and a bearing (not illustrated) for supporting the rotating member 7 is provided at a left end of the rotating member 7.

Here, in the electric power supply system illustrated in FIG. 1, a coaxial line structure is used as the configuration of the fixed member 8 and the rotating member 7. Specifically, each of the fixed member 8 and the rotating member 7 includes an inner conductor 9 (a first inner shaft conductor, a second inner shaft conductor) having a long shape, an outer conductor 13 (a first outer shaft conductor, a second outer shaft conductor) having a long shape and disposed outside the inner conductor 9 in a concentric form in relation to the inner conductor 9, and a high-frequency conductive path dielectric 5 (a first shaft insulator, a second shaft insulator) disposed mutually between the inner conductor 9 and the outer conductor 13 so as to insulate mutually the inner conductor 9 and the outer conductor 13.

The rotating member 8 and the rotating member 7 are disposed in such a relation that the respective outer conductors 13, the respective inner conductors 9, and the respective high-frequency conductive path dielectrics 5 are mutually disposed at an interval so as to be in non-contact with each other. Moreover, the facing surface of the outer conductors 13 and the inner conductors 9 is formed in such a shape that the area of the facing surface increases so that the outer conductors 13 and the inner conductors 9 can be capacitively coupled and appropriate pressure is applied from the longitudinal direction of the rotating shaft. Specifically, the facing surface has a tooth shape or the like.

A power transmission and communication circuit of the electric power supply system includes at least a load 26 (a load) electrically connected to the outer conductor 13 and the inner conductor 9 of the rotating member 7 and a high-frequency electric power source 27 (an electric power source) electrically connected to the outer conductor 13 and the inner conductor 9 of the fixed member 8.

Due to this configuration, the two rotating shafts can rotate mutually at the coupling portions. Moreover, high-frequency current can flow from either one of the two rotating shafts, and communication signals can be transmitted without being limited to power transmission.

However, the electric power supply system has the problems to be described below. Specifically, it is difficult to rotate the rotating member 7 in a state in which the rotating member 7 approaches the fixed member 8. Due to this, when the electric power supply system described above is actually used, stress is applied to the bearing of the rotating member 7 (or the fixed member 8), and the gap between the fixed member 8 and the rotating member 7 changes whereby the coupling capacitance changes. Moreover, as illustrated in FIG. 2, since a voltage is applied between the outer conductors 13 of the fixed member 8 and the rotating member 7, electromagnetic waves radiate from the electric power supply system toward the outside.

A configuration to be described below may be used as a configuration capable of eliminating such a problem. Specifically, a configuration in which the outer conductor 13 of the fixed member 8 makes contact with the outer conductor 13 of the rotating member 7 (hereinafter, this configuration will be referred to as an "electric power supply system which uses a shielding structure") may be used. Due to this configuration, since it is possible to rotate the rotating member 7 only while allowing the rotating member 7 to make close-contact with the fixed member 8, it is possible to prevent a change in the coupling capacitance. Moreover, since a shielding structure is formed when the outer conductor 13 of the fixed member 8 makes contact with the outer conductor 13 of the rotating member 7, the shielding structure can reduce the electromagnetic waves radiating from the electric power supply system toward the outside.

A configuration in which the outer conductor 13 of the rotating member 7 is covered by the outer conductor 13 of the fixed member 8 and another facing electrode is provided without using the facing portion of the outer conductor 13 of the fixed member 8 and the outer conductor 13 of the rotating member 7 and the facing portion of the inner conductor 9 of the fixed member 8 and the inner conductor 9 of the rotating member 7 as a power transmission coupling capacitance (hereinafter, this configuration will be referred to an "electric power supply system which uses independent electrodes") may be also used. Due to this configuration, since no voltage is applied between the outer conductor 13 of the fixed member 8 and the outer conductor 13 of the rotating member 7, the problem that the coupling capacitance changes is eliminated and the electromagnetic waves radiating from the electric power supply system toward the outside can be reduced. In this configuration, communication waves only can flow to the fixed member 8 and the rotating member 7, and alternatively, light only can flow when an optical waveguide is formed inside the fixed member 8 and the rotating member 7.

The electric power supply system of the present invention is formed based on the above-described configuration.

Figure 3:
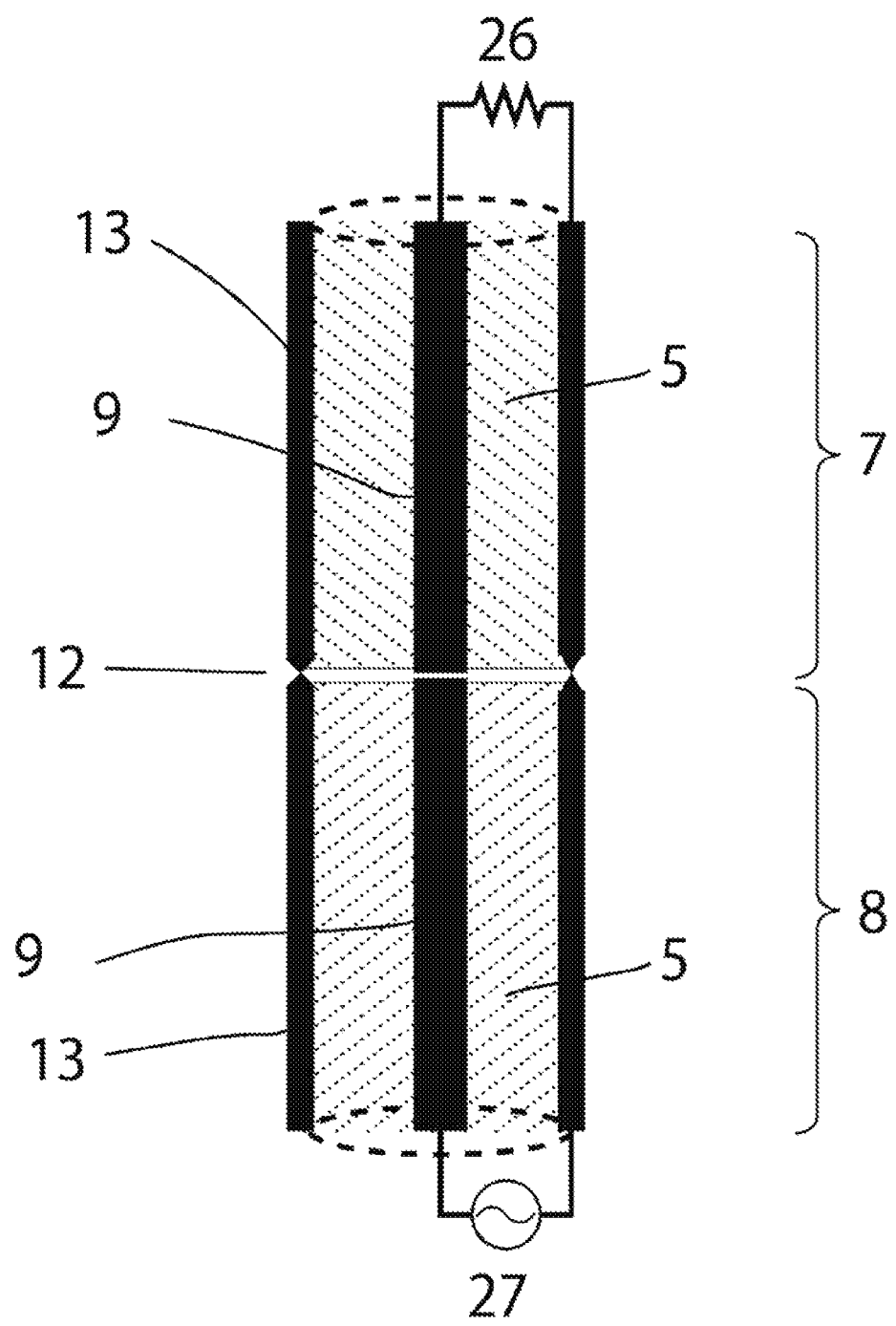
FIG. 3 is a side view illustrating a configuration of an electric power supply system which uses a shielding structure.

(2) Configuration of Electric Power Supply System which Uses Shielding Structure Next, a configuration of the electric power supply system which uses a shielding structure will be described. FIG. 3 is a side view illustrating a configuration of an electric power supply system which uses a shielding structure.

The electric power supply system illustrated in FIG. 3 has substantially the same configuration as the electric power supply system illustrated in FIG. 2, except for the configuration to be described below. Specifically, a contact structure (an electromagnetic wave attenuation structure) in which the outer conductor 13 of the fixed member 8 and the outer conductor 13 of the rotating member 7 are disposed so as to make contact with each other is formed so that a conductive property of the outer conductor 13 of the fixed member 8 and the outer conductor 13 of the rotating member 7 can be secured. In this case, the inner conductor 9 of the fixed member 8 and the inner conductor 9 of the rotating member 7 may be disposed, for example, so that the inner conductor 9 of the fixed member 8 and the inner conductor 9 of the rotating member 7 are in contact with each other, and alternatively the inner conductor 9 of the fixed member 8 and the inner conductor 9 of the rotating member 7 are in non-contact with each other. Due to this configuration, since a gap is not formed between the outer conductor 13 of the fixed member 8 and the outer conductor 13 of the rotating member 7 similarly to the electric power supply system illustrated in FIG. 2, it is possible to reduce the electromagnetic waves radiating from the electric power supply system toward the outside.

Here, when the outer conductor 13 of the fixed member 8 and the outer conductor 13 of the rotating member 7 make contact with each other in order to secure a conductive property, since a gap is formed between the outer conductors 13, the contact state between the outer conductor 13 of the fixed member 8 and the outer conductor 13 of the rotating member 7 may become insufficient. In this case, if a very small gap is formed, it is highly likely that a large coupling capacitance can be secured. However, practically, in a contact interface of the rotating member 7 in relation to the fixed member 8, a portion that makes contact with the fixed member 8 (hereinafter, this portion will be referred to as a "contact portion") and a portion that does not make contact with the fixed member 8 (hereinafter, this portion will be referred to as a "capacitance portion") are present in parallel. Moreover, there is a possibility that the proportion occupied by the contact portion and the capacitance portion in the contact interface of the rotating member 7 in relation to the fixed member 8 changes depending on a circumstance.

Moreover, the relation of a current, a voltage, and a coupling capacitance is expressed by Equations (1) and (2) below.

$$i = j \times \omega \times C \times V \quad (1)$$

$$\omega = 2 \times \pi \times f \quad (2)$$

Here, i is a current, j is a complex number, C is a coupling capacitance, V is a voltage generated in the coupling capacitance, and f is a frequency. From these equations (1) and (2), under a constant-current condition, the product between the coupling capacitance and the voltage generated in the coupling capacitance is constant. From this fact, when the coupling capacitance increases in a state in which the contact portion and the capacitance portion are present in parallel in the contact interface of the rotating member 7 in relation to the fixed member 8, since the applied voltage decreases, it can be said that the electromagnetic waves radiating from the electric power supply system toward the outside can be reduced. However, in this case, the voltage is ruled by a contact resistance.

In the electric power supply system illustrated in FIG. 3, the performance of the conductive or capacitive coupling occurring between the outer conductor 13 of the fixed member 8 and the outer conductor 13 of the rotating member 7 has to be secured even when stress is applied to the fixed member 8 or the rotating member 7. The configuration to be described later may be used as a configuration capable of securing the conductive property of the outer conductor 13 of the fixed member 8 and the outer conductor 13 of the rotating member 7 even when the outer conductor 13 of the fixed member 8 and the outer conductor 13 of the rotating member 7 rub against each other due to rotation of the rotating member 7.

FIGS. 4A to 4C to FIG. 6 are side views illustrating a configuration capable of securing a conductive property.

Figure 4:
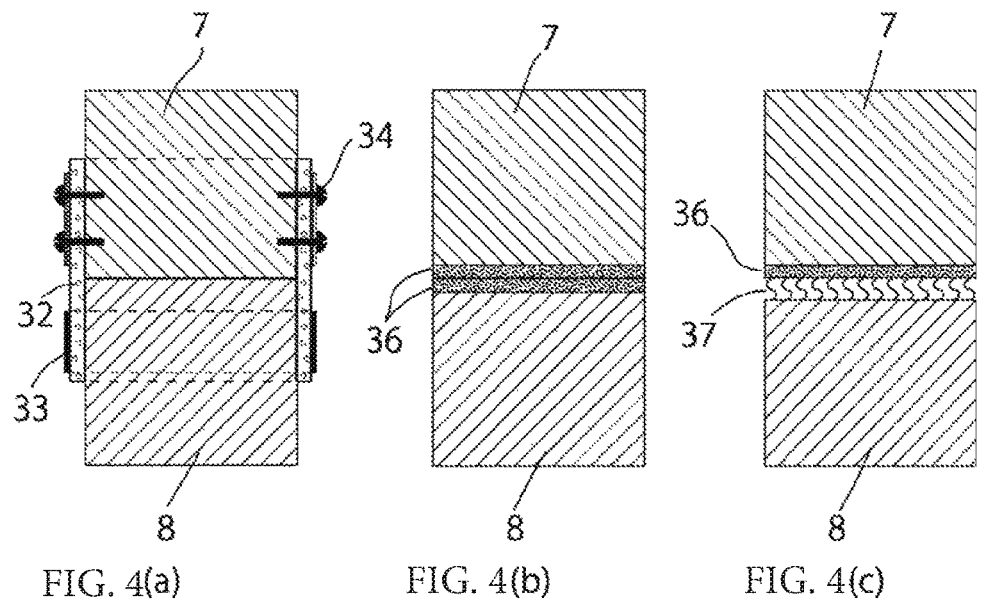
FIGS. 4A to 4C are side views illustrating a configuration capable of securing a conductive property.

First, an electric power supply system illustrated in FIG. 4A has substantially the same configuration as the electric power supply system illustrated in FIG. 3 except for the configuration to be described below. Specifically, metal (hereinafter, referred to as a "plastic metal 32") that is easily plastically deformed is provided so as to be wound around the fixed member 8 and the rotating member 7. Moreover, the plastic metal 32 is fixed to any one of the outer conductor 13 of the fixed member 8 and the outer conductor 13 of the rotating member 7 by fixing bolts 34 and is bound to the other of the outer conductor 13 of the fixed member 8 and the outer conductor 13 of the rotating member 7 by a band with spring 33 (or a rubber band). Here, as an example of the configuration of the plastic metal 32, a configuration in which a slit is formed along an axial direction of a steel member rolled around a bearing and an approximately cylindrical member formed of foamed aluminum, zinc aluminum, Babbitt metal, or white metal are employed. Moreover, the reason why the plastic metal 32 is used is because the contact area of the plastic metal 32 contacting the outer conductor 13 of the rotating member 7 increases as compared to metal that is easily plastically deformed when the outer conductor 13 of the rotating member 7 has a high degree of roundness and small unevenness. However, since the plastic metal 32 is scratched due to rubbing between the plastic metal 32 and the outer conductor 13 of the rotating member 7, it is necessary to replace the plastic metal 32 periodically. Due to this configuration, since it is possible to continuously apply force that causes the outer conductor 13 of the fixed member 8 and the outer conductor 13 of the rotating member 7 to make contact with each other, it is possible to secure a conductive property of the outer conductor 13 of the fixed member 8 and the outer conductor 13 of the rotating member 7. The contact interface of the outer conductor 13 of the fixed member 8 in relation to the rotating member 7 (or the contact interface of the outer conductor 13 of the rotating member 7 in relation to the fixed member 8) may be coated with a conductive lubricant, for example (the same lubricant may be coated on the contact interface illustrated in FIGS. 4B, 4C, 5, and 6).

The electric power supply system illustrated in FIG. 4B has substantially the same configuration as the electric power supply system illustrated in FIG. 3, except for the configuration to be described below. Specifically, the contact interface of the outer conductor 13 of the fixed member 8 in relation to the rotating member 7 and the contact interface of the outer conductor 13 of the rotating member 7 in relation to the fixed member 8 are mirror-polished. Moreover, the mirror-polished contact interface is coated with a conductive diamond-like carbon (hereinafter referred to as "a conductive DLC 36") having excellent slidability. The coating on the mirror-polished contact interface is not limited to the conductive DLC 36 but other coating materials having excellent slidability may be coated. Due to this configuration, since the contact interface of the outer conductor 13 of the fixed member 8 in relation to the rotating member 7 and the contact interface of the outer conductor 13 of the rotating member 7 in relation to the fixed member 8 function as sliding bearings, it is possible to reduce frictional resistance generated due to rubbing of the outer conductor 13 of the fixed member 8 and the outer conductor 13 of the rotating member 7 with rotation of the rotating member 7. Therefore, it is possible to reduce the electromagnetic waves radiating from the electric power supply system toward the outside while securing the conductive property of the outer conductor 13 of the fixed member 8 and the outer conductor 13 of the rotating member 7.

The electric power supply system illustrated in FIG. 4C has substantially the same configuration as the electric power supply system illustrated in FIG. 3, except for the configuration to be described below. Specifically, a conductive brush 37 is buried in at least one of the contact interface of the outer conductor 13 of the fixed member 8 in relation to the rotating member 7 and the contact interface of the outer conductor 13 of the rotating member 7 in relation to the fixed member 8. Moreover, the conductive DLC 36 is coated on the other of the contact interface of the outer conductor 13 of the fixed member 8 in relation to the rotating member 7 and the contact interface of the outer conductor 13 of the rotating member 7 in relation to the fixed member 8. Here, a brush formed of metal fiber or a conductive carbon nanotube, for example, is used as the conductive brush 37. Due to this configuration, since the frictional resistance generated due to rubbing of the outer conductor 13 of the fixed member 8 and the outer conductor 13 of the rotating member 7 with rotation of the rotating member 7 can be reduced, it is possible to reduce the electromagnetic waves radiating from the electric power supply system toward the outside while securing a conductive property of the outer conductor 13 of the fixed member 8 and the outer conductor 13 of the rotating member 7.

Figure 5:
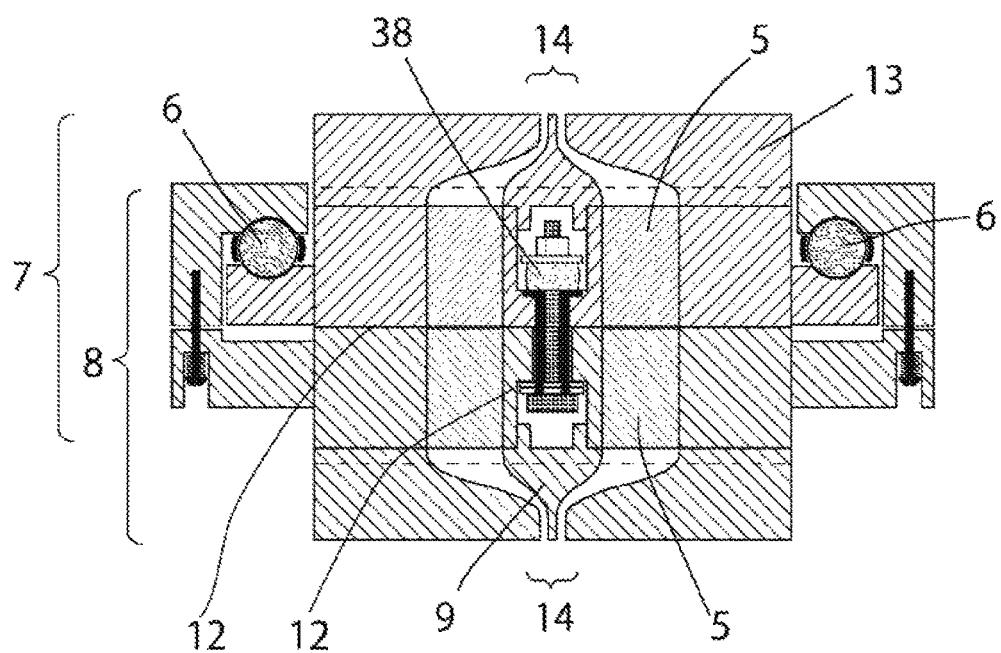
FIG. 5 is a side view illustrating a configuration capable of securing a conductive property.

The electric power supply system illustrated in FIG. 5 has substantially the same configuration as the electric power supply system illustrated in FIG. 3, except for the configuration to be described below. Specifically, the outer conductor 13 of the rotating member 7 and the outer conductor 13 of the fixed member 8 are disposed so as to make contact with each other with a rotary joint 12 interposed therebetween. Moreover, the inner conductor 9 of the rotating member 7 and the inner conductor 9 of the fixed member 8 are disposed to make contact with each other and are connected by a rubber bushing 38. Furthermore, the rotary joint 12 is provided between the rubber bushing 38 and these inner conductors 9. Moreover, a high-frequency input and output port 14 for inputting or outputting communication waves is provided at an end of the rotating member 7 on the opposite side of the fixed member 8 and an end of the fixed member 8 on the opposite side of the rotating member 7. Specifically, the contact interface of the fixed member 8 in relation to the rotating member 7 and the contact interface of the rotating member 7 in relation to the fixed member 8 are formed in a flat shape. Here, as a specific example of a configuration for maintaining the contact state between the outer conductor 13 of the fixed member 8 and the outer conductor 13 of the rotating member 7, a configuration in which a fixed member-side bearing washer 83 provided in the outer conductor 13 of the fixed member 8 is disposed to make contact with a rotating member-side bearing washer 84 attached to the outer conductor 13 of the rotating member 7 with a rolling member 17 formed of a conductive material interposed therebetween, and the fixed member-side bearing washer 83 is fixed to the rotating member-side bearing washer 84 by being pressed by a fixing screw with spring 85 is employed. Due to this configuration, it is possible to secure a conductive property of the outer conductor 13 of the fixed member 8 and the outer conductor 13 of the rotating member 7. Moreover, since the potential of the entire outer conductor 13 of the fixed member 8 and the entire outer conductor 13 of the rotating member 7 can be maintained by the rolling member 17 and the electromagnetic waves radiating from the electric power supply system toward the outside can be reduced, it is possible to allow the rolling member 17 to function as a shielding structure.

Figure 6:
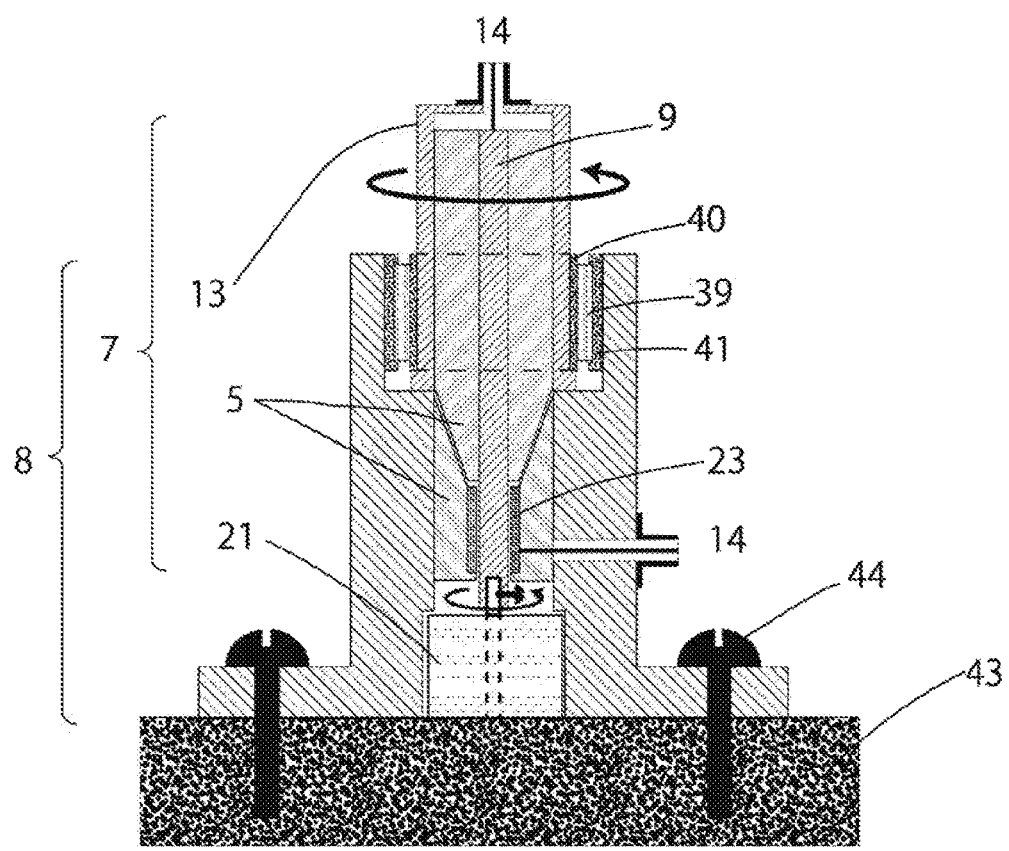
FIG. 6 is a side view illustrating a configuration capable of securing a conductive property.

The electric power supply system illustrated in FIG. 6 has substantially the same configuration as the electric power supply system illustrated in FIG. 3, except for the configuration to be described below. Specifically, an end of the fixed member 8 on the opposite side of the rotating member 7 is fixed to a base 43 by fixing bolts 44. Moreover, a motor 21 for rotating the inner conductor 9 of the fixed member 8 and the inner conductor 9 of the rotating member 7 is provided in a space surrounded by the outer conductor 13 of the fixed member 8, the high-frequency conductive path dielectric 5, the inner conductor 9, and the base 43. Moreover, the high-frequency conductive path dielectric 5 of the rotating member 7 and the high-frequency conductive path dielectric 5 of the fixed member 8 are disposed so as to make contact with each other with a sliding bearing 23 interposed therebetween. Moreover, the inner conductor 9 of the rotating member 7 and the inner conductor 9 of the fixed member 8 are formed integrally, and the inner conductor 9 of the fixed member 8 is connected to the motor 21 with a shaft fixing portion 22 interposed therebetween. Furthermore, the high-frequency input and output port 14 is provided at an end of the rotating member 7 on the opposite side of the fixed member 8 and a portion of the fixed member 8 close to the base 43. Here, as a specific example of a configuration for maintaining the contact state between the outer conductor 13 of the fixed member 8 and the outer conductor 13 of the rotating member 7, the outer conductor 13 of the fixed member 8 and the outer conductor 13 of the rotating member 7 are disposed so that portions thereof make contact with each other with a bearing inner ring 40, a needle-shaped roller bearing 39, and a bearing outer ring 41 interposed therebetween and the other portions make direct contact with each other. Here, the needle-shaped roller bearing 39 is a bearing for allowing the bearing inner ring 40 and the bearing outer ring 41 to make linear contact with each other. Due to this configuration, since the frictional resistance generated due to rubbing between the outer conductor 13 of the fixed member 8 and the outer conductor 13 of the rotating member 7 with rotation of the rotating member 7 can be reduced, it is possible to reduce the electromagnetic waves radiating from the electric power supply system toward the outside while securing a conductive property of the outer conductor 13 of the fixed member 8 and the outer conductor 13 of the rotating member 7. Particularly, since the needle-shaped roller bearing 39 is used, it is possible to adjust the magnitude of the frictional resistance depending on the length and the number of needle-shaped roller bearings 39.

(3) Configuration of electric power supply system which uses independent electrode Next, a configuration of an electric power supply system which uses independent electrodes will be described. In this description, first, a basic configuration will be described, and subsequently, a configuration adaptable to various uses, a configuration which simplifies the structure, and a configuration which uses general communication protocols will be described, and finally, a configuration capable of blowing air will be described.

(Configuration of Electric Power Supply System which Uses Independent Electrode: Basic Configuration)

Figure 8:
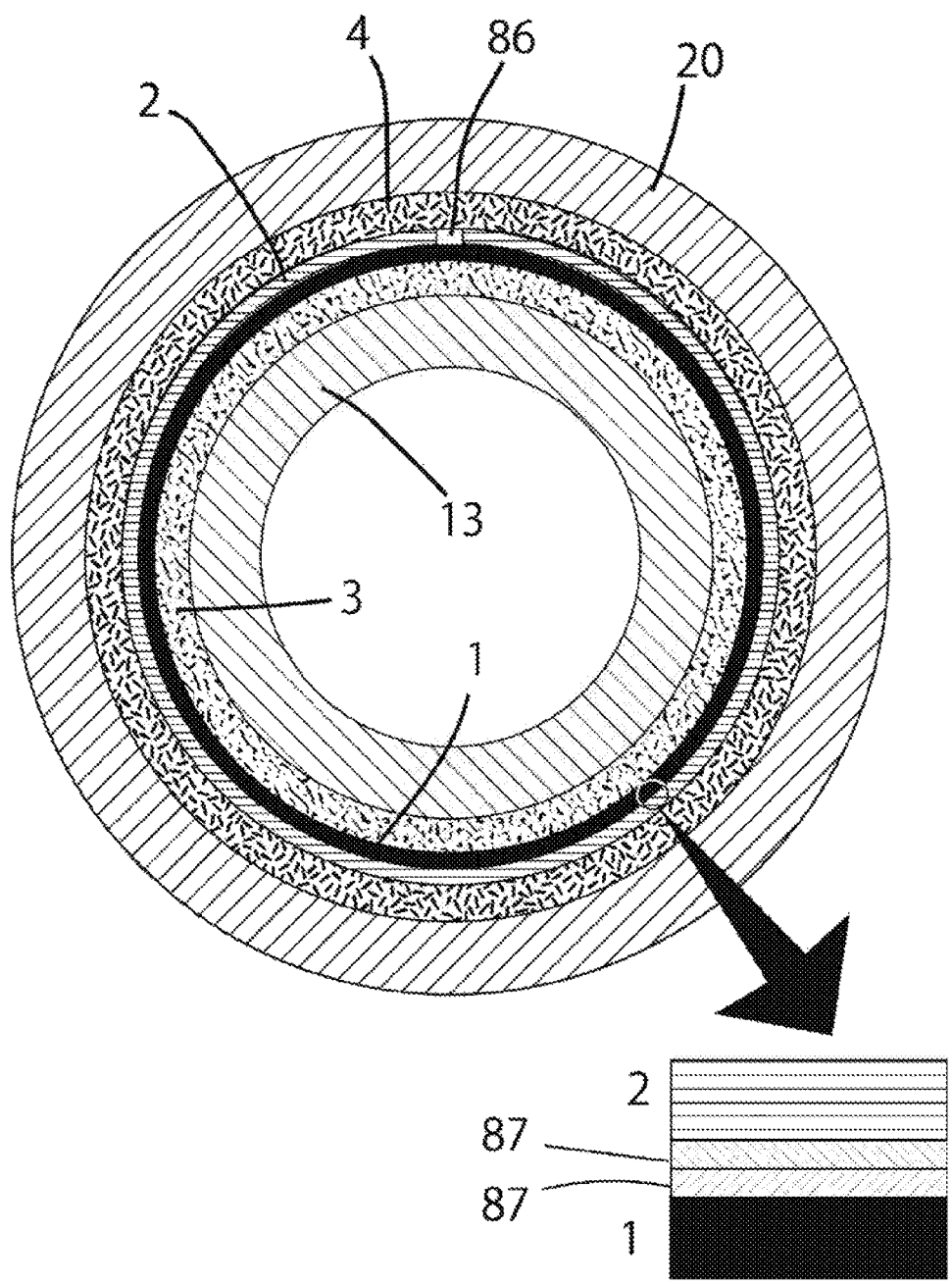
FIG. 8 is a cross-sectional view illustrating a configuration of a rotating member-side ring electrode and a fixed member-side ring electrode.

First, a basic configuration of an electric power supply system which uses independent electrodes will be described. FIGS. 7A to 7C and FIG. 9 are cross-sectional views illustrating a configuration of an electric power supply system which uses independent electrodes. FIG. 8 is a cross-sectional view illustrating a configuration of a rotating member-side ring electrode 1 and a fixed member-side ring electrode 2.

The electric power supply system illustrated in FIGS. 7A to 7C has substantially the same configuration as the electric power supply system illustrated in FIG. 2, except for the configuration to be described below. Specifically, a top plate 18 (a second outer shaft conductor) for supporting the rotating member 7 is attached to an end of the outer conductor 13 of the rotating member 7 on the opposite side of the fixed member 8 and a portion of the outer conductor 13 of the rotating member 7. Moreover, a bottom plate 19 (a first outer shaft conductor) which is a portion of the outer conductor 13 of the fixed member 8 and supports a cylinder body 20 which is a portion of the outer conductor 13 of the fixed member 8 is attached to an end of the cylinder body 20 (a first outer shaft conductor) on the opposite side of the rotating member 7. Furthermore, the high-frequency input and output port 14 is formed in each of the top plate 18 and the bottom plate 19.

Here, the configuration to be described below is employed so that portions (specifically the rotating member-side ring electrode 1 to be described later and the fixed member-side ring electrode 2 to be described later) to which the outer conductor 13 of the fixed member 8 and the outer conductor 13 of the rotating member 7 are electrically connected are not exposed. Specifically, a cover structure (an electromagnetic wave attenuation structure) in which at least a portion of the outer circumferential surface of the outer conductor 13 of the rotating member 7 is covered by the cylinder body 20 is formed. Here, the cylindrical fixed member-side ring electrode 2 positioned close to the top plate 18 illustrated in FIGS. 7A to 7C is fixed to a portion of the inner circumferential surface of the cylinder body 20 facing the outer circumferential surface of the outer conductor 13 of the rotating member 7 with a cylindrical fixed member-side ring electrode-fixing insulating pedestal (elastic) 4 interposed therebetween. Moreover, the cylindrical fixed member-side ring electrode 2 positioned close to the bottom plate 19 illustrated in FIGS. 7A to 7C is fixed to the portion with the cylindrical fixed member-side ring electrode-fixing insulating pedestal (elastic) 4 interposed therebetween. Moreover, the cylindrical rotating member-side ring electrode 1 is fixed to a position of the inner circumferential surface of the outer conductor 13 of the rotating member 7 facing the fixed member-side ring electrode 2 positioned close to the top plate 18 illustrated in FIGS. 7A to 7C with a cylindrical rotating member-side ring electrode-fixing insulating pedestal 3 which is a rigid member interposed therebetween. Moreover, the cylindrical rotating member-side ring electrode 1 is fixed to a position of the inner circumferential surface facing the fixed member-side ring electrode 2 positioned close to the bottom plate 19 illustrated in FIGS. 7A to 7C with the cylindrical rotating member-side ring electrode-fixing insulating pedestal 3 which is a rigid member interposed therebetween. In this case, the rotating member-side ring electrode-fixing insulating pedestal 3, the rotating member-side ring electrode 1, the fixed member-side ring electrode 2, and the fixed member-side ring electrode-fixing insulating pedestal (elastic) 4 positioned close to the top plate 18 and the bottom plate 19 illustrated in FIGS. 7A to 7C are disposed to be stacked along a direction orthogonal to the longitudinal direction of the electric power supply system. Moreover, the inner conductor 9 of the rotating member 7 and the inner conductor 9 of the fixed member 8 are disposed to make contact with each other and are connected by a conductive rotary joint pin 10. Furthermore, an extrusion spring 11 is provided in the conductive rotary joint pin 10. The extrusion spring 11 is a spring for pressing the conductive rotary joint pin 10 from the fixed member 8 toward the rotating member 7 with spring force in order to allow a communication signal to flow toward the inner conductor 9 of the rotating member 7.

As an example of the configuration of the rotating member-side ring electrode 1 and the fixed member-side ring electrode 2, a configuration in which the adhesion between the fixed member-side ring electrode 2 and the rotating member-side ring electrode 1 is enhanced to obtain contact stability is employed. Specifically, as illustrated in FIG. 8, the fixed member-side ring electrode 2 is disposed to be able to abut on the rotating member-side ring electrode 1 disposed on the inner side of the rotating member-side ring electrode 1. Moreover, the fixed member-side ring electrode 2 is disposed so that the fixed member-side ring electrode-fixing insulating pedestal (elastic) 4 formed of an elastic material is sandwiched between the fixed member-side ring electrode 2 and the cylinder body 20 disposed on the outer side of the fixed member-side ring electrode 2 in a state in which pressure is applied to the fixed member-side ring electrode-fixing insulating pedestal (elastic) 4. In this case, a cut portion 86 is formed in the fixed member-side ring electrode 2 so that a portion deformed by pressure, of the fixed member-side ring electrode-fixing insulating pedestal (elastic) 4 enters into the cut portion 86.

Moreover, a configuration to be described below is employed so that electric power can be transmitted from an electric power source (not illustrated) connected to the fixed member 8 and a load (not illustrated) connected to the rotating member 7. Specifically, a power port 15 for connecting a lead wire 30 and a wiring path for transmitting electric power from an electric power source (not illustrated) toward the fixed member-side ring electrode 2 positioned close to the top plate 18 illustrated in FIGS. 7A to 7C via the lead wire 30 and another power port 15 for connecting the lead wire 30 and a wiring path for transmitting electric power from the electric power source (not illustrated) toward the fixed member-side ring electrode 2 positioned close to the bottom plate 19 illustrated in FIGS. 7A to 7C via the lead wire 30 are provided in the cylinder body 20. Moreover, a wiring path for transmitting electric power from the rotating member-side ring electrode 1 positioned close to the top plate 18 illustrated in FIGS. 7A to 7C toward a negative terminal (not illustrated) via the lead wire 30 and another wiring path for transmitting electric power from the rotating member-side ring electrode 1 positioned close to the bottom plate 19 illustrated in FIGS. 7A to 7C toward a negative terminal (not illustrated) via the lead wire 30 are provided in the top plate 18 and the outer conductor 13 of the rotating member 7. Furthermore, another power port 15 for connecting to these lead wires 30 are provided in the top plate 18.

A configuration to be described below is employed so that the contact state between the outer conductor 13 of the rotating member 7 and the cylinder body 20 of the fixed member 8 can be maintained. Specifically, the bearing washer 16 provided in the cylinder body 20 of the fixed member 8 is disposed to make contact with the bearing washer 16 attached to the outer conductor 13 of the rotating member 7 with the rolling member 17 interposed therebetween and is fixed to the bearing washer 16 of the rotating member 7 while being pressed by the fixing screw with spring 85.

Due to this configuration, since the rotating member-side ring electrode 1 and the fixed member-side ring electrode 2 are not exposed, it is possible to reduce the electromagnetic waves radiating from the electric power supply system toward the outside. Moreover, when the above-described electrodes and the lead wires 30 are used, contact coupling or electric field coupling occurs between the rotating member-side ring electrode 1 and the fixed member-side ring electrode 2 positioned close to the top plate 18 illustrated in FIGS. 17A to 17C and between the rotating member-side ring electrode 1 and the fixed member-side ring electrode 2 positioned close to the bottom plate 19 illustrated in FIGS. 7A to 7C. Therefore, since an electric power transmission voltage is not applied to the outer conductor 13 of the rotating member 7 and the cylinder body 20 of the fixed member 8 in order to supply electric power from the electric power source (not illustrated) to the load (not illustrated), it is possible to further reduce the electromagnetic waves radiating from the electric power supply system toward the outside.

In the electric power supply system illustrated in FIGS. 7A to 7C, when certain stress is applied to the fixed member 8 or the rotating member 7, although a gap is formed between the inner conductors 9 of the fixed member 8 and the rotating member 7 and between the outer conductors 13 of the fixed member 8 and the rotating member 7, the gap is small. Therefore, when communication is performed using high-frequency communication waves, the influence of the gap is negligible. Moreover, when optical communication is performed, the gap does not cause any problem. On the other hand, the gap cannot be allowed when DC power transmission (contact power feeding) or commercial frequency power transmission is performed. Moreover, although impedance increases when non-contact power transmission (using a frequency of several MHz) is performed, the influence of the gap can be negligible when a parallel resonance circuit is used.

Figure 9:
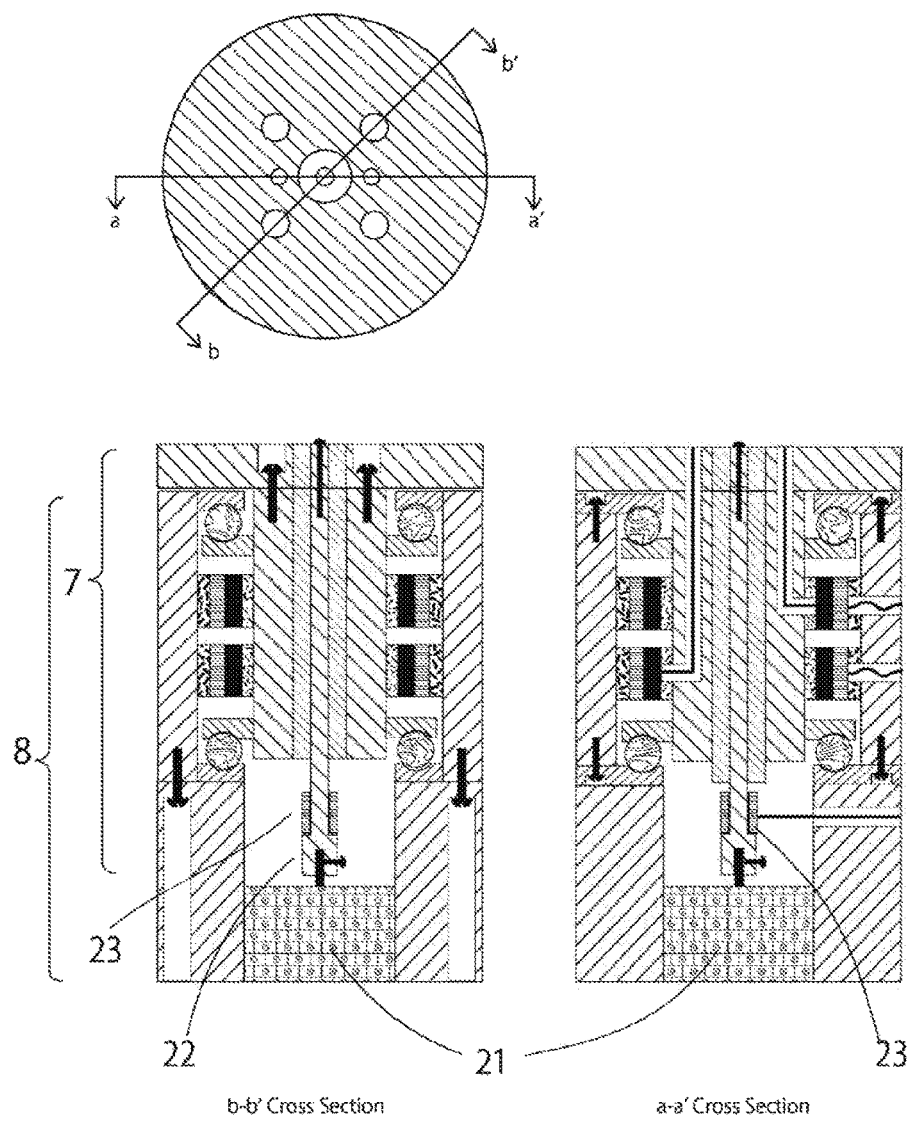
FIG. 9 is a cross-sectional view illustrating a configuration of an electric power supply system which uses independent electrodes.

The electric power supply system illustrated in FIG. 9 has substantially the same configuration as the electric power supply system illustrated in FIGS. 7A to 7C and further includes a motor 21. The motor 21 is configured using an existing motor, for example, and is disposed inside the bottom plate 19 on a lower side than the inner conductor 9 of the fixed member 8 formed integrally with the inner conductor of the rotating member 8 and is connected to the inner conductor 9 of the fixed member 8 by the shaft fixing portion 22. Due to this configuration, it is possible to drive the motor 21 using a portion of the electric power transmitted by the inner conductor 9 of the fixed member 8.

(Configuration of Electric Power Supply System which Uses Independent Electrode: Configuration Adaptable to Various Uses)

Next, a configuration adaptable to various uses will be described. In the electric power supply systems illustrated in FIGS. 7A to 7C and FIG. 9, since the fixed member-side ring electrode 2 and the rotating member-side ring electrode 1 are in direct abutting contact with each other, the conductive property may not be secured due to rubbing of these electrodes. Moreover, the electric power supply system illustrated in FIGS. 7A to 7C and FIG. 9 is not suitable for uses where high-speed rotation, large power transmission, high reliability, or robustness is required. The configuration capable of eliminating the problems of the electric power supply systems illustrated in FIGS. 7A to 7C and FIG. 9 will be described below.

Figure 10:
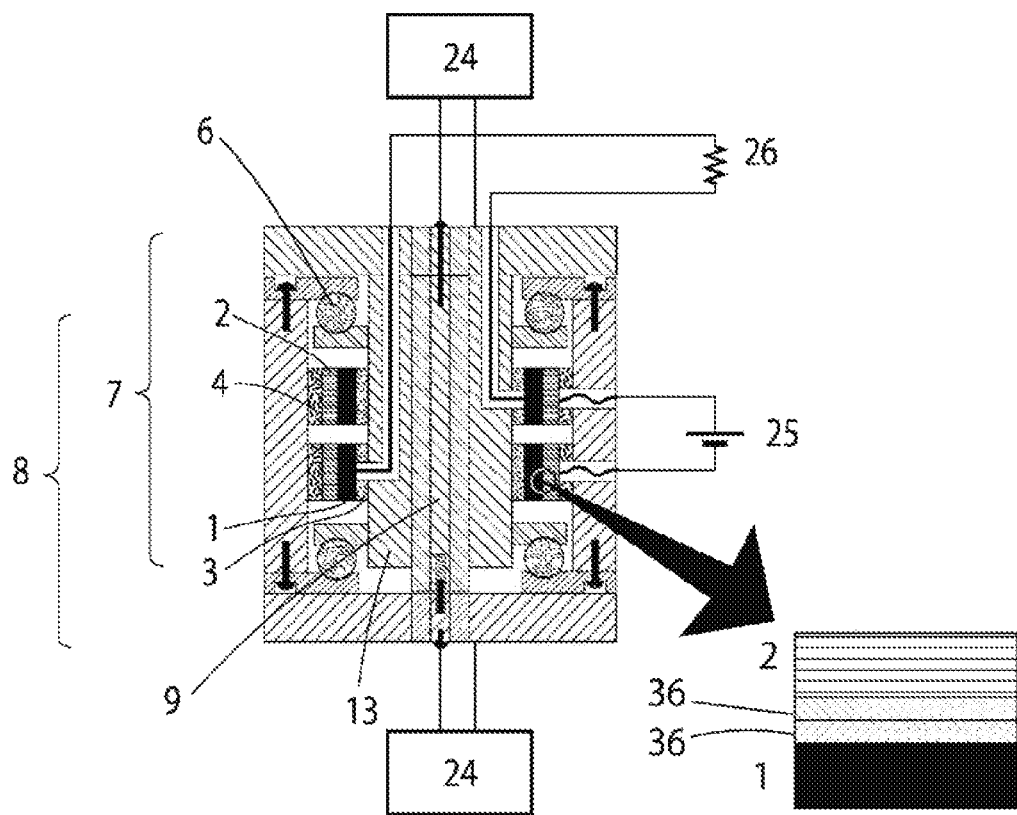
FIG. 10 is a cross-sectional view illustrating a configuration of an electric power supply system which uses independent electrodes.
Figure 11:
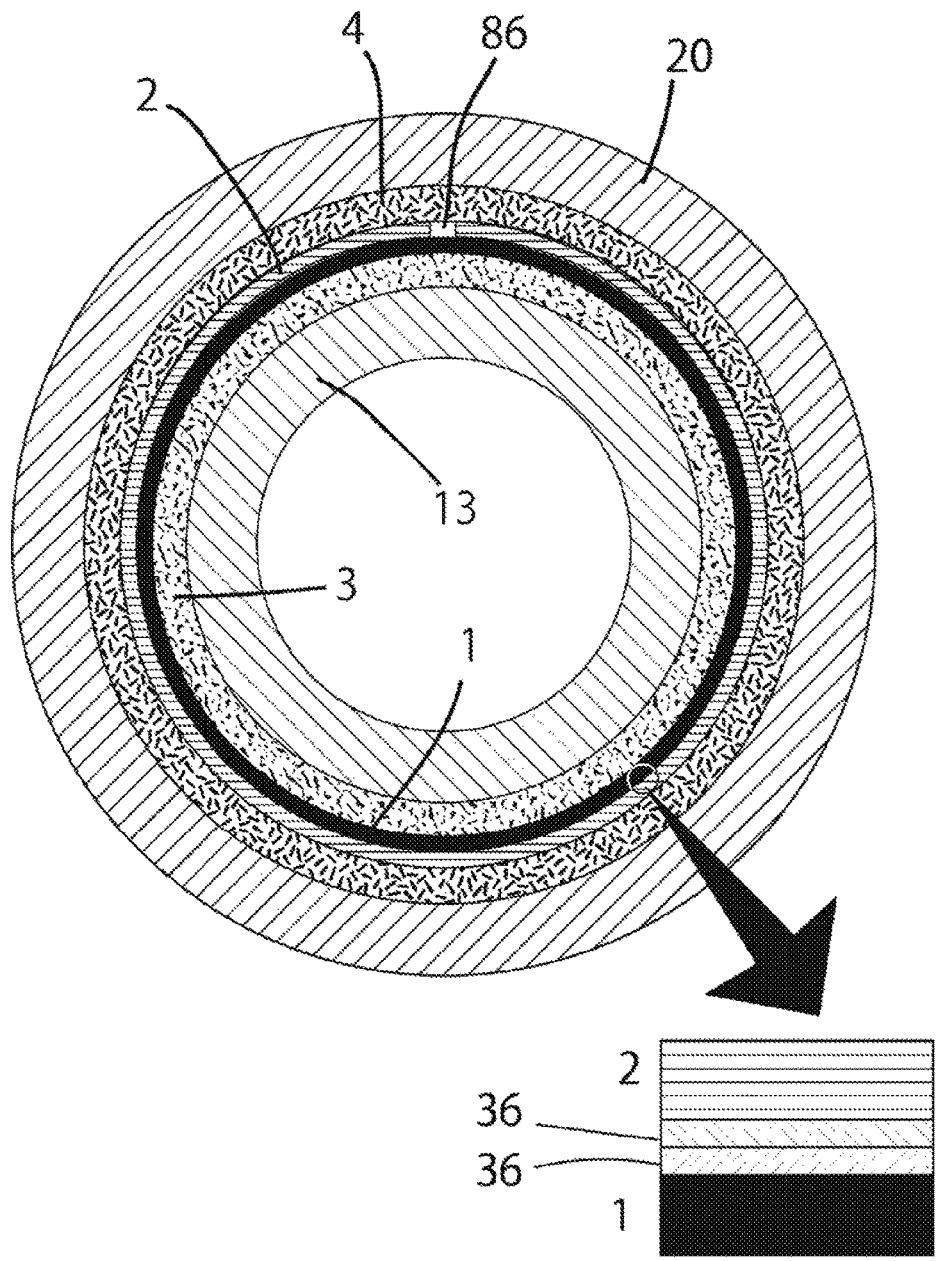
FIG. 11 is a cross-sectional view illustrating a configuration of a rotating member-side ring electrode and a fixed member-side ring electrode.
Figure 12:
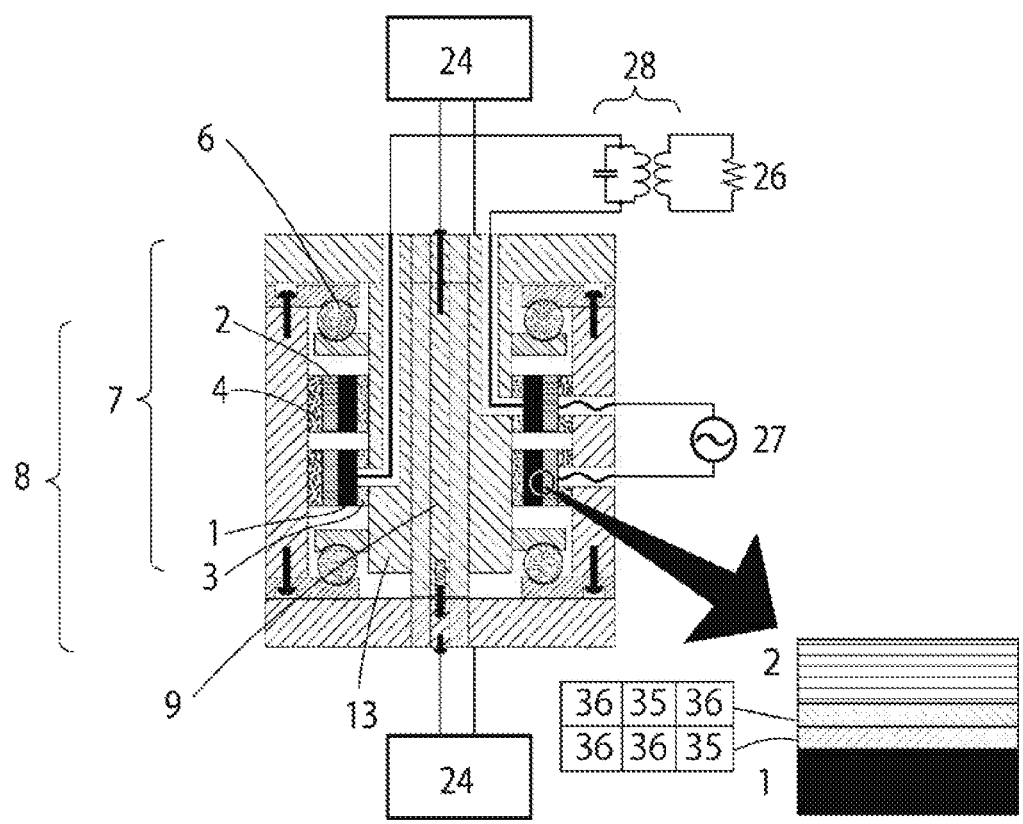
FIG. 12 is a cross-sectional view illustrating a configuration of an electric power supply system which uses independent electrodes.
Figure 13:
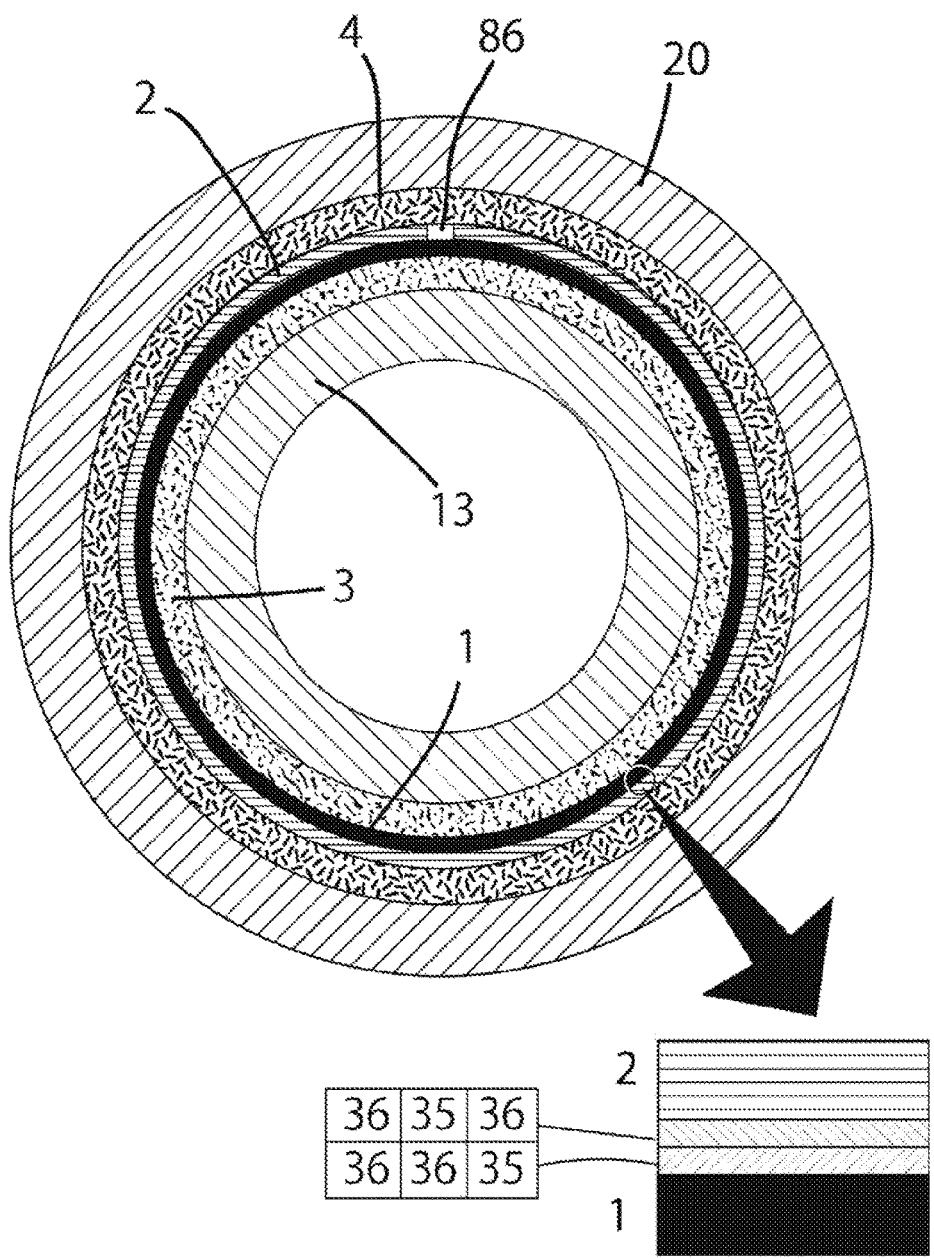
FIG. 13 is a cross-sectional view illustrating a configuration of a rotating member-side ring electrode and a fixed member-side ring electrode.
Figure 14:
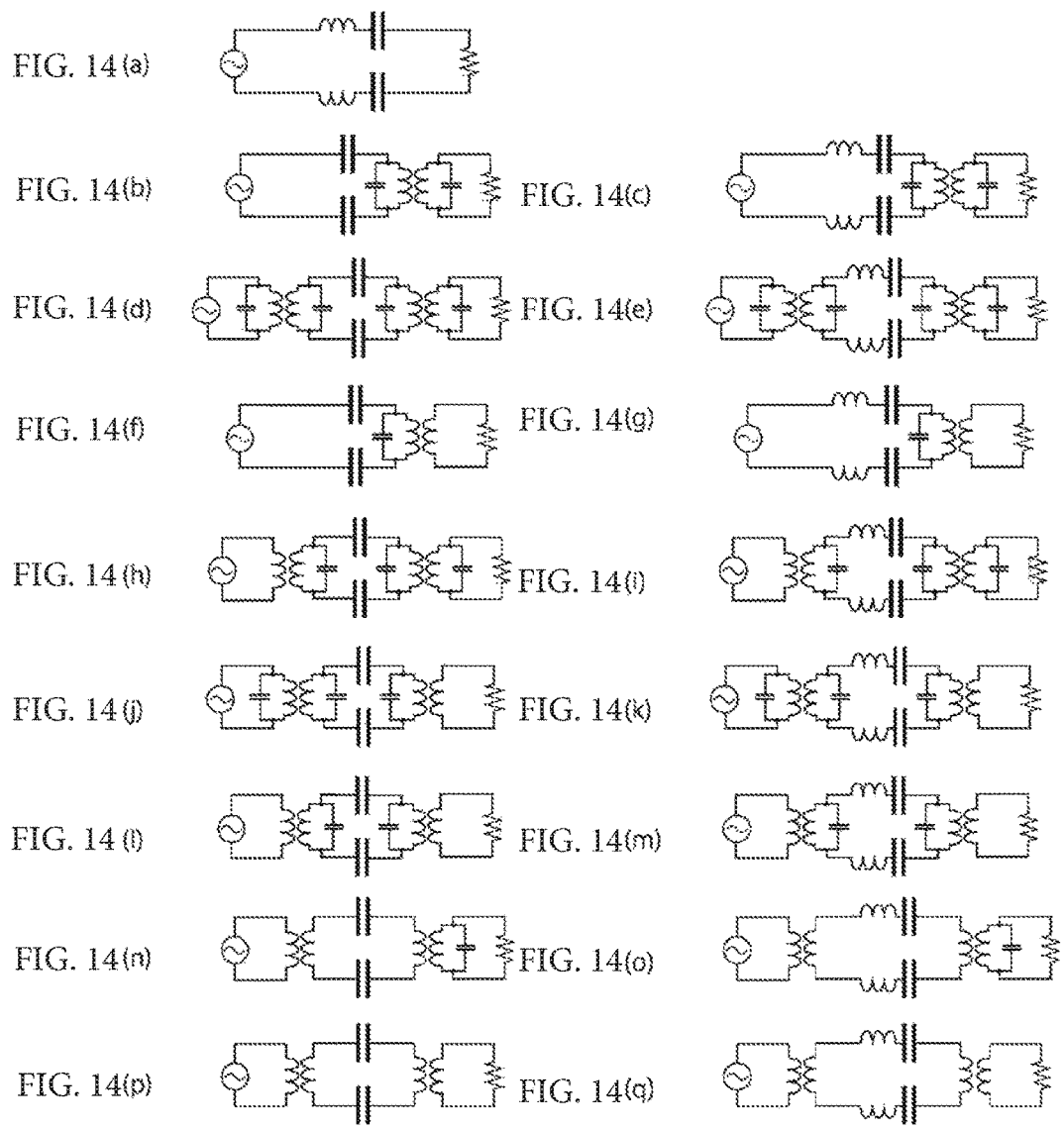
FIGS. 14A to 14Q are diagrams illustrating a configuration of a circuit used in the electric power supply system illustrated in FIG. 10.

FIGS. 10 and 12 are cross-sectional views illustrating a configuration which uses independent electrodes. FIGS. 11 and 13 are cross-sectional views illustrating a configuration of the rotating member-side ring electrode 1 and the fixed member-side ring electrode 2. FIGS. 14A to 14Q are diagrams illustrating a configuration of a circuit used in the electric power supply system illustrated in FIG. 10.

First, the electric power supply system illustrated in FIG. 10 has substantially the same configuration as the electric power supply system illustrated in FIGS. 7A to 7C, except that a conductive DLC 36 is coated on the contact interface of the rotating member-side ring electrode 1 in relation to the fixed member-side ring electrode 2 and the contact interface of the fixed member-side ring electrode 2 in relation to the rotating member-side ring electrode 1 close to the top plate 18 and the bottom plate 19 illustrated in FIG. 10. Moreover, the high-frequency input and output ports 14 provided in the top plate 18 and the bottom plate 19 are connected to a transceiver 24. Furthermore, a circuit including a load 26 connected to the two power ports 15 provided in the top plate 18 and a DC electric power source 25 connected to the two power ports 15 provided in the cylinder body 20 are connected to the electric power supply system illustrated in FIG. 10. Due to this configuration, when the conductive DLC 36 is used, contact coupling occurs between the rotating member-side ring electrode 1 and the fixed member-side ring electrode 2 positioned close to the top plate 18 illustrated in FIG. 10 and between the rotating member-side ring electrode 1 and the fixed member-side ring electrode 2 positioned close to the bottom plate 19 illustrated in FIG. 10. Therefore, since a conductive property can be provided to the conductive DLC 36, it is possible to perform DC power transmission (contact power feeding). Therefore, since a resonance circuit or the like is not required, it is possible to reduce the cost. Moreover, since it is not necessary to prepare an application for utilization of frequencies, the electric power supply system can be used in low-cost products such as toys. Moreover, since the contact area of the rotating member-side ring electrode 1 in relation to the fixed member-side ring electrode 2 can be increased, it is possible to improve the performance and reduce the cost as compared to existing slip rings. Moreover, the electric power supply system can be used for ultra-low noise applications.

As a modification of the electric power supply system illustrated in FIG. 10, an insulating diamond-like carbon (hereinafter, referred to as an "insulating DLC 35") may be coated on the contact interface of the rotating member-side ring electrode 1 in relation to the fixed member-side ring electrode 2 and the contact interface of the fixed member-side ring electrode 2 in relation to the rotating member-side ring electrode 1. In this case, dimples may be formed in the contact interfaces so that an oil film is present on the interfaces in order to decrease the frictional resistance generated when the contact interfaces coated with the insulating DLC 35 rub against each other. In this case, circuits illustrated in FIG. 14F is connected to this electric power supply system (however, any of various circuits illustrated in FIGS. 14A to 14Q may be applied). Specifically, the circuit illustrated in FIG. 14F includes a resonance circuit 28 including the load 26 connected to the two power ports 15 provided in the top plate 18 and the high-frequency electric power source 27 connected to the two power ports 15 provided in the cylinder body 20. Due to this configuration, when the insulating DLC 35 is used, since electric field coupling occurs between the rotating member-side ring electrode 1 of the fixed member-side ring electrode 2 positioned close to the top plate 18 illustrated in FIG. 10 and between the rotating member-side ring electrode 1 and the fixed member-side ring electrode 2 positioned close to the bottom plate 19 illustrated in FIG. 10, it is possible to perform non-contact power feeding. Particularly, since the insulating DLC 35 has higher strength than the conductive DLC 36, the electric power supply system can be used for uses where high-speed rotation, large power transmission, high reliability, or robustness is required. That is, by appropriately using the conductive DLC 36 and the insulating DLC 35 which are coating films, the electric power supply system illustrated in FIG. 10 can be used depending on various uses.

The electric power supply system illustrated in FIG. 12 has substantially the same configuration as the modification of the electric power supply system illustrated in FIG. 10 described above, except that the conductive DLC 36 is coated on any one of the contact interface of the rotating member-side ring electrode 1 in relation to the fixed member-side ring electrode 2 and the contact interface of the fixed member-side ring electrode 2 in relation to the rotating member-side ring electrode 1, and the insulating DLC 35 is coated on the other of the contact interface of the rotating member-side ring electrode 1 in relation to the fixed member-side ring electrode 2 and the contact interface of the fixed member-side ring electrode 2 in relation to the rotating member-side ring electrode 1. In this case, nonwoven fabric or paper that absorbs water may be provided between the contact interfaces in order to decrease the frictional resistance generated when the contact interface coated with the conductive DLC 36 and the contact interface coated with the insulating DLC 35. Alternatively, an alloy that stores hydrogen may be provided so that hydrogen is emitted from the alloy. The reason why water or hydrogen is allowed to be present between the contact interfaces is to extend the service life of the conductive DLC 36 and the insulating DLC 35. Due to this configuration, it is possible to further decrease the thickness of the insulating DLC 35 and to increase the coupling capacitance.

(Configuration which Simplifies Structure of Electric Power Supply System which Uses Independent Electrode)

Next, the configuration which simplifies the structure will be described. In the electric power supply systems illustrated in FIGS. 10 and 12, although the rotating member-side ring electrode 1 and the fixed member-side ring electrode 2 can function as a sliding bearing, since the rolling member 17, the fixed member-side bearing washer 83, and the rotating member-side bearing washer 84 are used, the number of components increases. The configuration capable of eliminating the problems of the electric power supply systems illustrated in FIGS. 10 and 12 will be described below.

Figure 21:
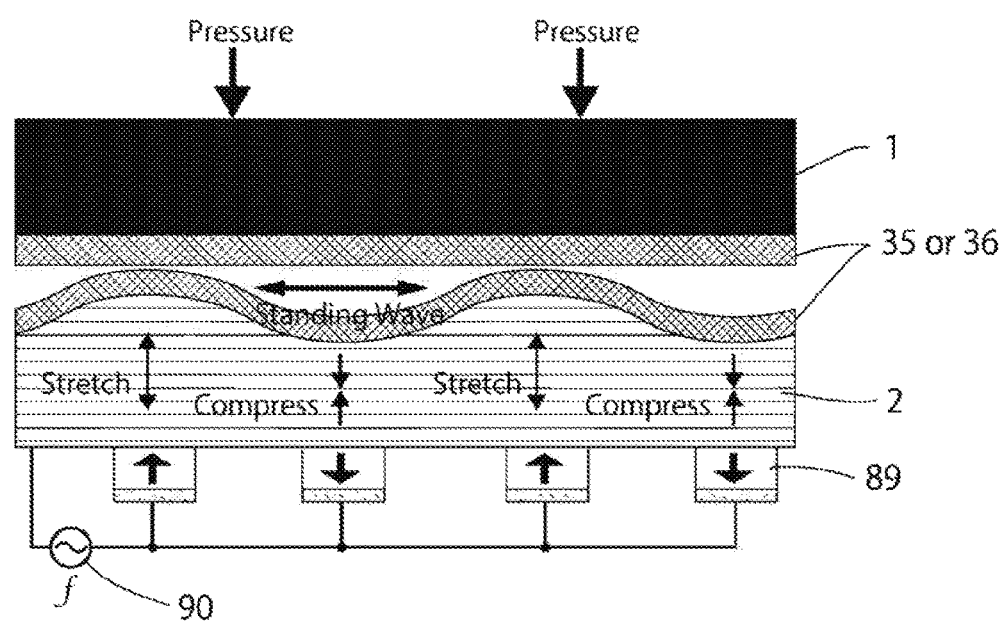
FIG. 21 is an enlarged view illustrating a configuration of a rotating member-side ring electrode and a fixed member-side ring electrode of the electric power supply system illustrated in FIG. 20.
Figure 22:
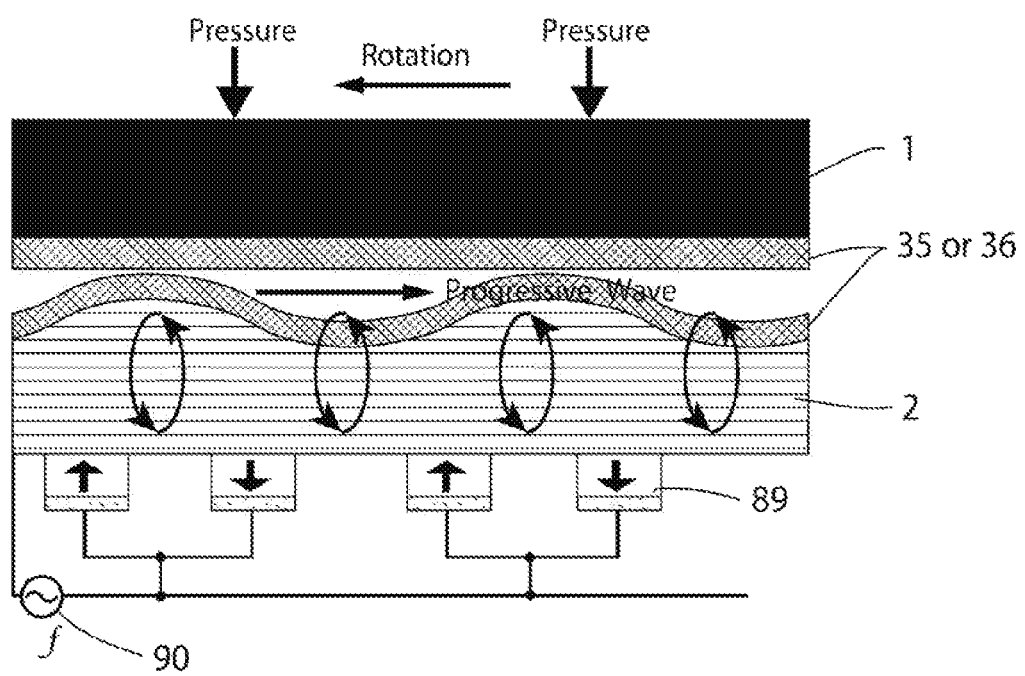
FIG. 22 is an enlarged view illustrating a configuration of a rotating member-side ring electrode and a fixed member-side ring electrode of the electric power supply system illustrated in FIG. 20.

FIGS. 15 to 20 are cross-sectional views illustrating a configuration of an electric power supply system which uses independent electrodes. FIGS. 21 and 22 are enlarged views illustrating the configuration of the rotating member-side ring electrode 1 and the fixed member-side ring electrode 2 of the electric power supply system illustrated in FIG. 20.

First, the electric power supply system illustrated in FIG. 15 has substantially the same configuration as the electric power supply system illustrated in FIG. 10, except for the configuration to be described below. Specifically, a flange shaft 45 (a second outer shaft conductor) which is a portion of the outer conductor 13 and is formed integrally with the outer conductor 13 so as to protrude toward the outer side is formed in the outer conductor 13 of the rotating member 7. Moreover, a pressing bracket 46 (a first outer shaft conductor) which is a portion of the outer conductor 13 of the fixed member 8 is attached to an end of the cylinder body 20 of the fixed member 8 close to the top plate 18.

Here, the configuration to be described below is employed so that portions to which the outer conductor 13 of the fixed member 8 and the outer conductor 13 of the rotating member 7 are electrically connected are not exposed. Specifically, a cover structure (an electromagnetic wave attenuation structure) in which at least a portion of the outer circumferential surface of the outer conductor 13 of the rotating member 7 and the outer circumferential surface of the flange shaft 45 is covered by the cylinder body 20, the pressing bracket 46, and the bottom plate 19 is formed. Here, the ring-shaped fixed member-side ring electrode 2 positioned close to the top plate 18 illustrated in FIG. 15 is fixed to a portion of the inner circumferential surface of the pressing bracket 46 facing the outer circumferential surface of the flange shaft 45 with a ring-shaped ring electrode-crimping elastic plate 29 interposed therebetween. Moreover, the ring-shaped fixed member-side ring electrode 2 positioned close to the bottom plate 19 illustrated in FIG. 15 is fixed to a portion of the inner circumferential surface of the bottom plate 19 facing the outer circumferential surface of the flange shaft 45 with the ring-shaped ring electrode-crimping elastic plate 29 interposed therebetween. Furthermore, the ring-shaped rotating member-side ring electrode 1 is fixed to a position of the outer circumferential surface of the flange shaft 45 facing and making contact with the fixed member-side ring electrode 2 positioned close to the top plate 18 illustrated in FIG. 15 with the ring-shaped ring electrode-crimping elastic plate 29 interposed therebetween. Moreover, the ring-shaped rotating member-side ring electrode 1 is fixed to a position of the outer circumferential surface facing and making contact with the fixed member-side ring electrode 2 positioned close to the bottom plate 19 illustrated in FIG. 15 with the ring-shaped ring electrode-crimping elastic plate 29 interposed therebetween. In this case, the ring electrode-crimping elastic plate 29, the rotating member-side ring electrode 1, the fixed member-side ring electrode 2, and the ring electrode-crimping elastic plate 29 positioned close to the top plate 18 and the bottom plate 19 illustrated in FIG. 15 are disposed to be stacked along the longitudinal direction of the electric power supply system. Moreover, the sliding bearing 23 is provided between the outer conductor 13 and the pressing bracket 46 so that the frictional resistance generated due to rubbing of the pressing bracket 46 and the outer conductor 13 of the rotating member 7 is reduced and the electric power supply system endures the radial load received from the left-right direction. In the same manner, the sliding bearing 23 is also provided between the bottom plate 19 and the outer conductor 13 of the rotating member 7. Furthermore, the ring electrode-crimping elastic plate 29 and the rotating member-side ring electrode 1 positioned close to the top plate 18 and the bottom plate 19 illustrated in FIG. 15 are crimped by the pressing bracket 46 with the ring electrode-crimping elastic plate 29 interposed therebetween so that the electric power supply system endures the axial load received from the above.

The configuration to be described below is employed so that electric power can be transmitted from the electric power source (not illustrated) connected to the fixed member 8 toward the load (not illustrated) connected to the rotating member 7. Specifically, a wiring path for transmitting electric power from the electric power source (not illustrated) toward the fixed member-side ring electrode 2 positioned close to the top plate 18 illustrated in FIG. 15 via the lead wire 30 is formed in the bottom plate 19, the cylinder body 20, and the pressing bracket 46, and a power port 15 for connecting to the lead wire 30 is formed in the bottom plate 19. Moreover, a wiring path for transmitting electric power from the rotating member-side ring electrode 1 positioned close to the top plate 18 illustrated in FIG. 15 to a negative terminal (not illustrated) via the lead wire 30 and a wiring path for transmitting electric power from the rotating member-side ring electrode 1 positioned close to the bottom plate 19 illustrated in FIG. 15 toward a negative terminal (not illustrated) via the lead wire 30 are formed in the top plate 18 and the outer conductor 13 of the rotating member 7, and a power port 15 for connecting to these lead wires 30 is formed in the top plate 18.

Due to this configuration, since it is possible to decrease the number of components as compared to the electric power supply systems illustrated in FIGS. 10 and 12, it is possible to simplify the structure. Moreover, since the rotating member 7 and the fixed member 8 are configured as a coaxial line structure, it is possible to perform communication wave-based communication.

The electric power supply system illustrated in FIG. 16 has substantially the same configuration as the electric power supply system illustrated in FIG. 15, except for the configuration to be described below. Specifically, an optical waveguide 49 is provided in the rotating member 7 and the fixed member 8 instead of the inner conductor 9 of the rotating member 7 and the inner conductor 9 of the fixed member 8. Moreover, an optical coupler 47 for splitting one input signal into a plurality of signals and coupling a plurality of input signals to one signal is provided in an end of the optical waveguide 49 close to the top plate 18 and an end of the bottom plate 19. Due to this configuration, optical communication can be performed between these optical couplers 47 via the optical waveguide 49.

The electric power supply system illustrated in FIG. 17 has substantially the same configuration as the electric power supply system illustrated in FIG. 15, except for the configuration to be described below. Specifically, the length in the longitudinal direction of the outer conductor 13 of the rotating member 7, the length in the longitudinal direction of the high-frequency conductive path dielectric 5, and the length in the longitudinal direction of the inner conductor 9 are set to be larger than that of the electric power supply system illustrated in FIG. 15. Moreover, the length in the longitudinal direction of the outer conductor 13 of the fixed member 8, the length in the longitudinal direction of the high-frequency conductive path dielectric 5, and the length in the longitudinal direction of the inner conductor 9 are set to be larger than that of the electric power supply system illustrated in FIG. 15. Furthermore, the top plate 18 and the cylinder body 20 of the fixed member 8 are in direct abutting contact with each other and are connected by a fixing tool or the like.

Figure 17:
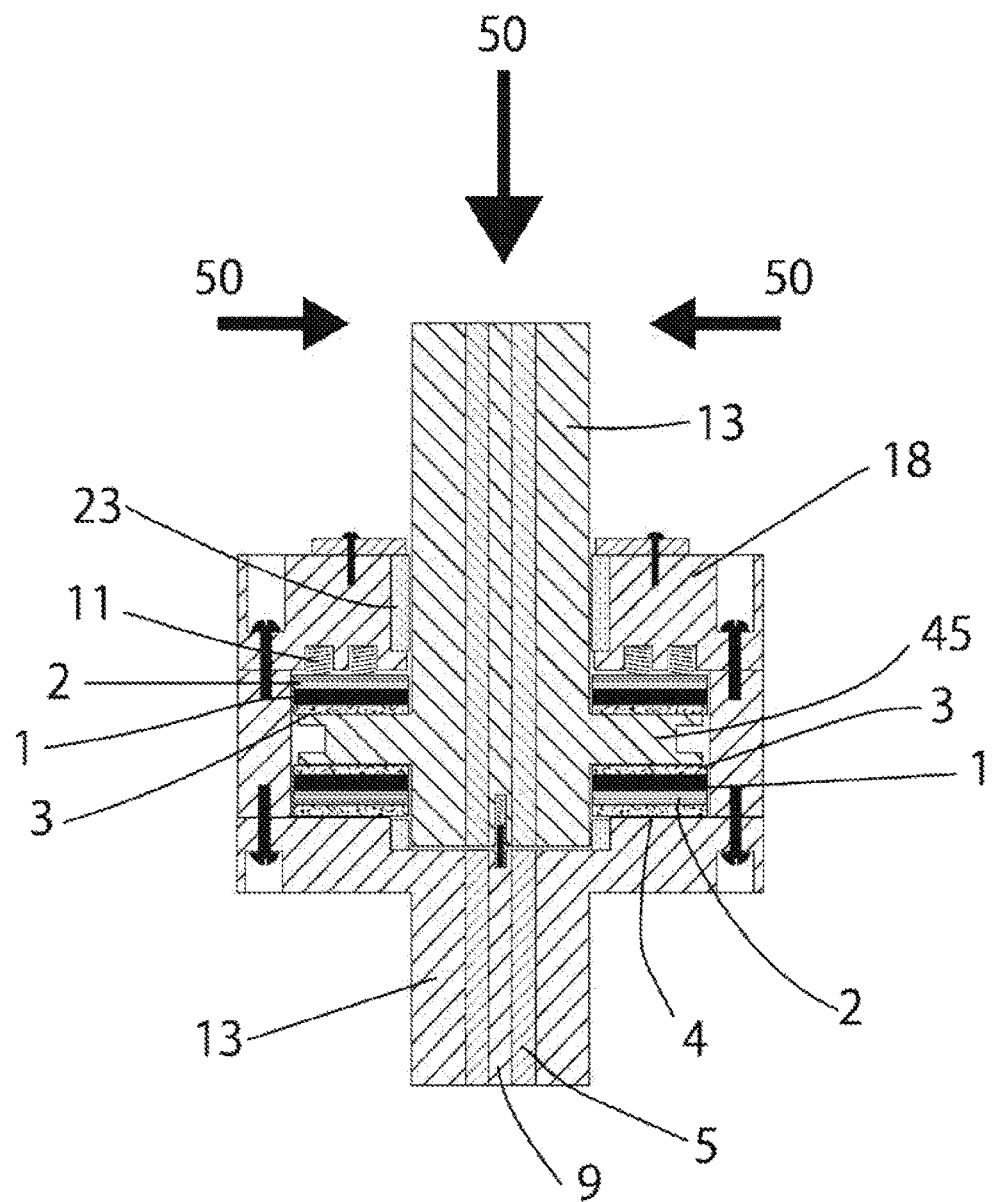
FIG. 17 is a cross-sectional view illustrating a configuration of an electric power supply system which uses independent electrodes.

The ring-shaped fixed member-side ring electrode 2 positioned close to the top plate 18 illustrated in FIG. 17 is fixed to a portion of the inner circumferential surface of the pressing bracket 46 facing the outer circumferential surface of the flange shaft 45 with the extrusion spring 11 interposed therebetween. Moreover, the ring-shaped fixed member-side ring electrode 2 positioned close to the bottom plate 19 illustrated in FIG. 17 is fixed to a portion of the inner circumferential surface of the bottom plate 19 facing the outer circumferential surface of the flange shaft 45 with the ring-shaped fixed member-side ring electrode-fixing insulating pedestal (elastic) 4 interposed therebetween. Furthermore, the ring-shaped rotating member-side ring electrode 1 is fixed to a position of the outer circumferential surface of the flange shaft 45 facing and making contact with the fixed member-side ring electrode 2 positioned close to the top plate 18 illustrated in FIG. 17 with the ring-shaped rotating member-side ring electrode-fixing insulating pedestal 3 interposed therebetween, and the ring-shaped rotating member-side ring electrode 1 is fixed to a position of the outer circumferential surface facing and making contact with the fixed member-side ring electrode 2 positioned close to the bottom plate 19 illustrated in FIG. 17 via the ring-shaped rotating member-side ring electrode-fixing insulating pedestal 3 interposed between. In this case, the extrusion spring 11, the rotating member-side ring electrode 1, the fixed member-side ring electrode 2, and the rotating member-side ring electrode-fixing insulating pedestal 3 positioned close to the top plate 18 illustrated in FIG. 17 are disposed to be stacked along the longitudinal direction of the electric power supply system. Moreover, the fixed member-side ring electrode-fixing insulating pedestal (elastic) 4, the rotating member-side ring electrode 1, the fixed member-side ring electrode 2, and the ring electrode-crimping elastic plate 29 positioned close to the bottom plate 19 illustrated in FIG. 17 are disposed to be stacked along the longitudinal direction of the electric power supply system. Furthermore, the sliding bearing 23 is provided between the outer conductor 13 and the top plate 18 so that the frictional resistance generated due to rubbing of the top plate 18 and the outer conductor 13 of the rotating member 7 and the electric power supply system endures the radial load received from the left-right direction. In the same manner, the sliding bearing 23 is also provided between the bottom plate 19 and the outer conductor 13 of the rotating member 7. The contact area of these sliding bearings 23 is set to be larger than that of the sliding bearings 23 of the electric power supply system illustrated in FIG. 15.

Due to this configuration, even when the length in the longitudinal direction of the outer conductor 13 in each of the rotating member 7 and the fixed member 8, the length in the longitudinal direction of the high-frequency conductive path dielectric 5, and the length in the longitudinal direction of the inner conductor 9 are set to be relatively large, it is possible to form the electric power supply system in a stable structure.

Figure 18:
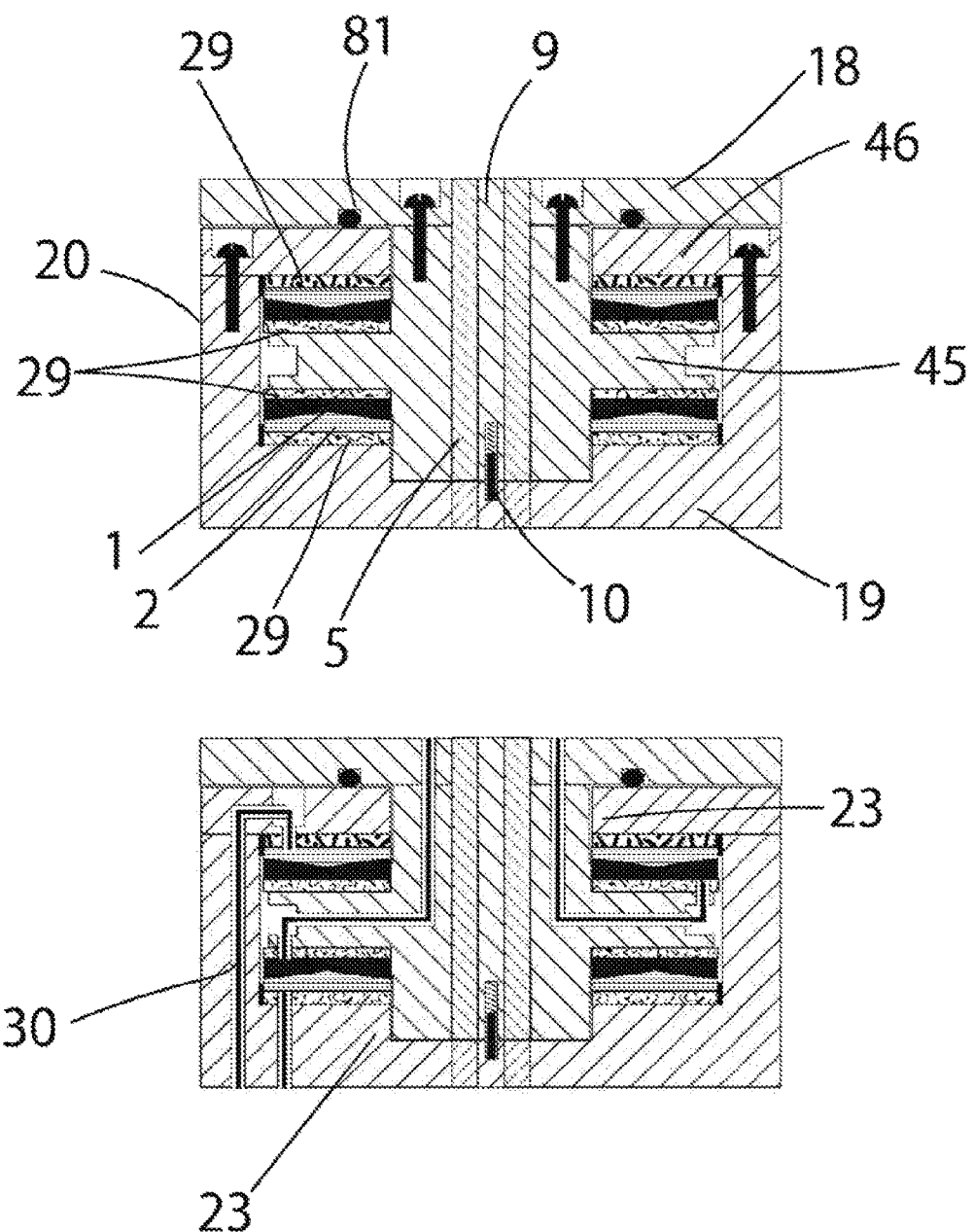
FIG. 18 is a cross-sectional view illustrating a configuration of an electric power supply system which uses independent electrodes.

The electric power supply system illustrated in FIG. 18 has substantially the same configuration as the electric power supply system illustrated in FIG. 15, except for the configuration to be described below as well as the fact that the sliding bearing is omitted. Specifically, a cross-section orthogonal to the lateral direction of the rotating member-side ring electrode 1 positioned close to the top plate 18 illustrated in FIG. 18 and a cross-section orthogonal to the lateral direction of the fixed member-side ring electrode 2 are formed in a V-shape. In the same manner, a cross-section orthogonal to the lateral direction of the rotating member-side ring electrode 1 positioned close to the bottom plate 19 illustrated in FIG. 18 and a cross-section orthogonal to the lateral direction of the fixed member-side ring electrode 2 are formed in a V-shaped. Moreover, the contact interface in relation to the fixed member-side ring electrode 2, of the rotating member-side ring electrode 1 positioned close to the bottom plate 19 and the top plate 18 illustrated in FIG. 18 and the contact interface of the fixed member-side ring electrode 2 in relation to the rotating member-side ring electrode 1 are polished using a polishing method (for example, a mirror-polishing method or the like) which decreases a frictional coefficient. Furthermore, an O-ring 81 for preventing entrance of a foreign material such as dust is provided between the top plate 18 and the pressing bracket 46. Due to this configuration, since the sliding bearing can be eliminated, it is possible to reduce the manufacturing cost.

The electric power supply system illustrated in FIG. 19 has substantially the same configuration as the electric power supply system illustrated in FIG. 18, except for the configuration to be described below. Specifically, a cross-section orthogonal to the lateral direction of the rotating member-side ring electrode 1 positioned close to the top plate 18 illustrated in FIG. 19 and a cross-section orthogonal to the lateral direction of the fixed member-side ring electrode 2 are formed in a U-shape. In the same manner, a cross-section orthogonal to the lateral direction of the rotating member-side ring electrode 1 positioned close to the bottom plate 19 illustrated in FIG. 19 and a cross-section orthogonal to the lateral direction of the fixed member-side ring electrode 2 are also formed in a U-shape. Due to this configuration, similarly to the electric power supply system illustrated in FIG. 18, since the sliding bearing can be eliminated, it is possible to reduce the manufacturing cost.

The electric power supply system illustrated in FIG. 20 has substantially the same configuration as the electric power supply system illustrated in FIG. 15, except for the configuration to be described below. Specifically, as illustrated in FIG. 21, a plurality of piezoelectric ceramic elements 89 for vibrating the fixed member-side ring electrode 2 using ultrasound waves is attached to a side surface of the fixed member-side ring electrode 2 positioned close to the bottom plate 19 and the top plate 18 illustrated in FIG. 20 on the opposite side of the side surface close to the rotating member-side ring electrode 1. Moreover, the piezoelectric ceramic elements 89 are disposed so that the stretching and compression direction of the piezoelectric ceramic element 89 is reverse to the direction of a voltage and are electrically connected to an electric power source 90 for piezoelectric elements.

Here, a vibration amplitude of the contact interface of the fixed member-side ring electrode 2 in relation to the rotating member-side ring electrode 1, vibrated by the piezoelectric ceramic elements 89 is specifically 1 μm or smaller, and is set so that the insulating DLC 35 or the conductive DLC 36 coated on the contact interface does not peel off.

Due to this configuration, when standing waves are caused to stand on the contact interface of the fixed member-side ring electrode 2 in relation to the rotating member-side ring electrode 1 by the ultrasound waves output from the plurality of piezoelectric ceramic elements 89, vibration larger than the vibration of an atomic cluster generated due to rubbing of the rotating member-side ring electrode 1 is applied to the insulating DLC 35 or the conductive DLC 36 coated on the contact interface. Therefore, a gap is formed in a portion between the fixed member-side ring electrode 2 and the rotating member-side ring electrode 1. Due to the gap formed in this way, it is possible to suppress accumulation of stress on the contact interface and to further enhance the slidability. However, when the fixed member-side ring electrode 2 and the rotating member-side ring electrode 1 are in close contact with each other, since the fixed member-side ring electrode 2 and the rotating member-side ring electrode 1 vibrate integrally even when ultrasound waves are applied from the piezoelectric ceramic element 89, the gap is not formed and the above-described effect is not obtained. In this case, the gap can be formed by changing the mechanical material property (for example, the modulus of elasticity) of the rotating member-side ring electrode 1 and the fixed member-side ring electrode 2 so that the vibrations of the fixed member-side ring electrode 2 and the rotating member-side ring electrode 1 in relation to the ultrasound waves applied from the piezoelectric ceramic element 89 are different. Therefore, it is possible to obtain the above-described effect. As described above, when the ultrasound wave-based vibration is applied, since the contact portion is also formed while contributing to reduction in the frictional resistance generated between the fixed member-side ring electrode 2 and the rotating member-side ring electrode 1, it is effective in securing the conductive property of the fixed member-side ring electrode 2 and the rotating member-side ring electrode 1.

When the ultrasound wave-based vibration is applied, since the contact portion is formed, the frictional resistance increases if a sliding speed increases. Therefore, it is necessary to decrease the relative speed between the fixed member-side ring electrode 2 and the rotating member-side ring electrode 1. As an example of a method of decreasing the relative speed between the fixed member-side ring electrode 2 and the rotating member-side ring electrode 1, as illustrated in FIG. 22, a method of generating progressive waves like a ultrasound motor to rotate and vibrate the surface of the fixed member-side ring electrode 2 having the piezoelectric ceramic element 89 attached thereto may be used. In this way, when the rotating member-side ring electrode 1 moves in a motor driving direction, since the relative speed is decreased by an amount corresponding to the speed in the tangential direction of the rotational vibration, it is possible to decrease the frictional resistance when the rotating member-side ring electrode 1 is rotating. In this case, it is possible to provide the function of a driving motor to the rotating member 8 and the fixed member 7.

(Configuration which Uses General Communication Protocols, of Electric Power Supply System which Uses Independent Electrode)

Next, a configuration which uses general communication protocols will be described. In the electric power supply systems illustrated in FIGS. 15 and 16, communication can be performed using general communication protocols. The configuration which uses general communication protocols will be described below. Here, the configuration which uses general communication protocols is broadly classified into a configuration in which contact power feeding and communication wave-based communication are performed, a configuration in which non-contact power feeding and communication wave-based communication are performed, a configuration in which contact power feeding and optical communication are performed, and a configuration in which non-contact power feeding and optical communication are performed. The details of these configurations will be described below.

(Configuration of Electric Power Supply System which Uses Independent Electrodes: Configuration which Uses General Communication Protocols: Configuration in which Contact Power Feeding and Communication Wave-Based Communication are Performed)

Figure 23:
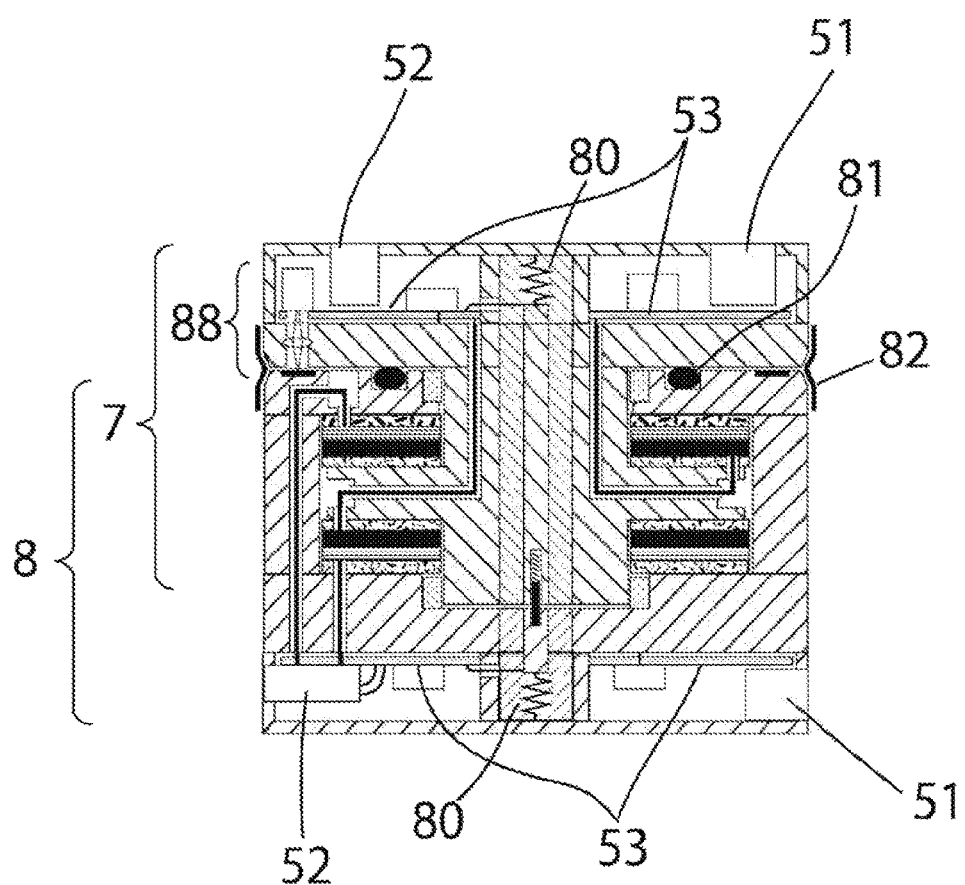
FIG. 23 is a cross-sectional view illustrating a configuration of an electric power supply system which uses independent electrodes.
Figure 24:
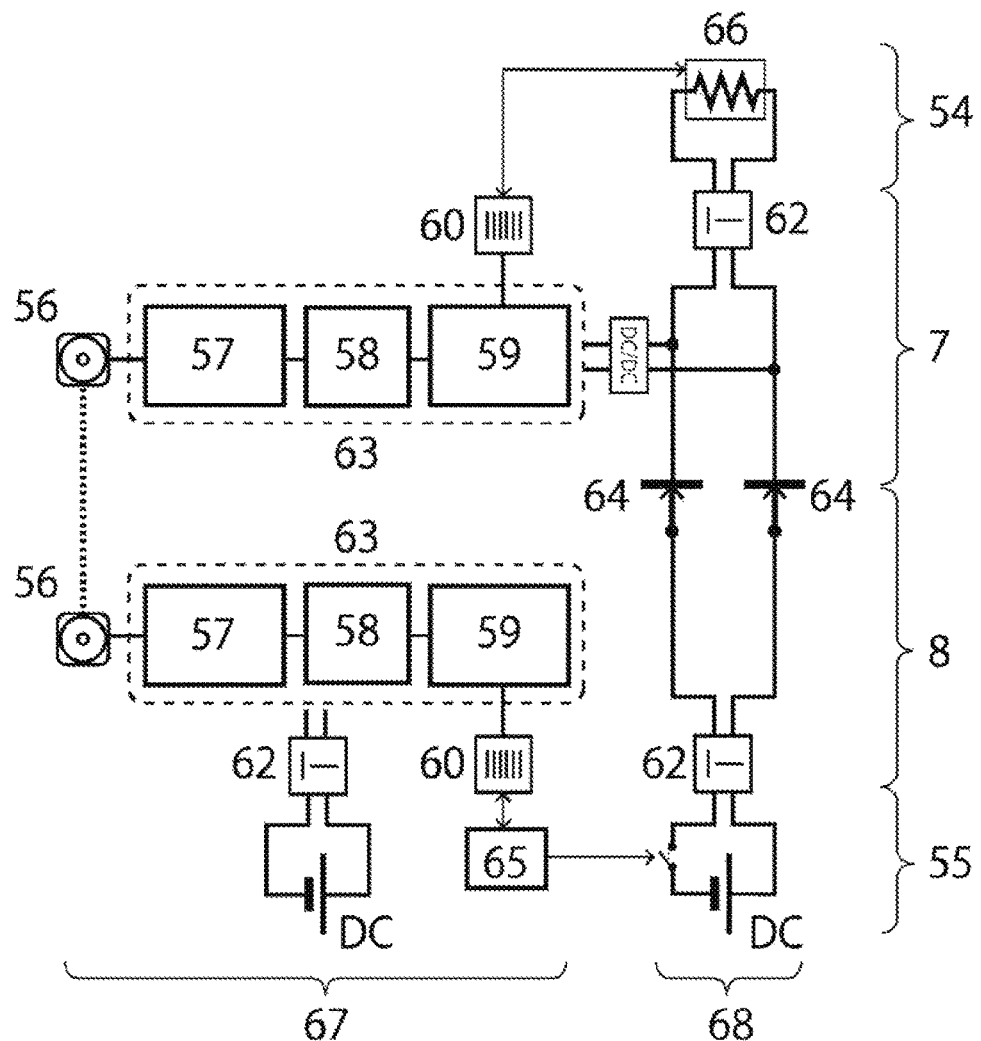
FIG. 24 is a diagram illustrating an example of a configuration of a circuit when an electric power supply system performs contact electric power feeding and communication wave-based communication.

First, a configuration in which contact power feeding and communication wave-based communication are performed will be described. FIG. 23 is a cross-sectional view illustrating a configuration of an electric power supply system which uses independent electrodes. FIG. 24 is a diagram illustrating an example of a configuration of a circuit when an electric power supply system performs contact power feeding and communication wave-based communication.

The electric power supply system illustrated in FIG. 23 has substantially the same configuration as the electric power supply system illustrated in FIG. 15, except for the configuration to be described below. Specifically, an electric power source 55 (a DC electric power source) and a fixed member-side device 55 are provided on the side of the fixed member 8, and a rotating member-side device 54 is provided on the side of the rotating member 7. Moreover, a heat-shrinkable resin cover 82 and the O-ring 81 for preventing entrance of a foreign material such as dust are provided between the top plate 18 and the pressing bracket 46. Furthermore, a rotary encoder 88 that detects a rotation angle of the rotating member 7 and outputs the detected rotation angle to the outside is attached to the top plate 18.

Here, as a specific example of the configuration for transmitting electric power from the electric power source 55 to the rotating member-side device 54, a DC electric power source socket 52 for connecting the electric power source 55 and the fixed member-side ring electrode 2 positioned close to the top plate 18 illustrated in FIG. 23 via the lead wire 30 and connecting the electric power source 55 and the fixed member-side ring electrode 2 positioned close to the bottom plate 19 illustrated in FIG. 23 via the lead wire 30 is provided in the bottom plate 19. Moreover, the DC electric power source socket 52 for connecting the rotating member-side device 54 and the rotating member-side ring electrode 1 positioned close to the top plate 18 illustrated in FIG. 23 via the lead wire 30 and connecting the rotating member-side device 54 and the rotating member-side ring electrode 1 positioned close to the bottom plate 19 illustrated in FIG. 23 via the lead wire 30 are provided in the top plate 18.

As a specific example of the configuration for performing communication between the fixed member-side device 55 and the rotating member-side device 54, a modular jack 51 for receiving signals output from the fixed member-side device 55 and a medium conversion unit 53 connected to the modular jack 51 and the inner conductor 9 of the fixed member 8 so as to convert the signals output from the modular jack 51 according to a predetermined communication protocol (for example, a wireless LAN protocol) are provided in the bottom plate 19. Moreover, the medium conversion unit 53 connected to the inner conductor 9 of the rotating member 7 so as to convert the signals delivered from the inner conductor 9 according to a predetermined communication protocol (for example, the Ethernet (registered trademark) protocol) and the modular jack 51 connected to the medium conversion unit 53 and the rotating member-side device 54 so as to output the signals converted by the medium conversion unit 53 to the rotating member-side device 54 are provided in the top plate 18. Furthermore, a terminating resistor 80 is attached to an end of the inner conductor 9 of the rotating member 7 on the opposite side of the fixed member 8 and an end of the inner conductor 9 of the fixed member 8 on the opposite side of the rotating member 7.

The configuration to be described below is employed as a configuration of the circuit used in the electric power supply system illustrated in FIG. 23. Specifically, as illustrated in FIG. 24, an electric power transmitting unit 68 positioned close to the fixed member 8, a pair of contact electrodes 64 (corresponding to the rotating member-side ring electrode 1 and the fixed member-side ring electrode 2 illustrated in FIG. 23), and an electric power transmitting unit 68 positioned close to the rotating member 7 are provided as a configuration of the circuit for transmitting electric power from the electric power source 55 to the reception-side device 66 (corresponding to the rotating member-side device 54 illustrated in FIG. 23).

Here, the electric power transmitting unit 68 positioned close to the fixed member 8 includes a DC outlet 62 (corresponding to the DC electric power source socket 52 positioned close to the bottom plate 19 illustrated in FIG. 23). The DC outlet 62 receives electric power from the electric power transmitting unit 68 including the electric power source 55. Moreover, the pair of contact electrodes 64 delivers the electric power received from the DC outlet 62 of the electric power transmitting unit 68 positioned close to the fixed member 8 to the electric power transmitting unit 68 positioned close to the rotating member 7. Furthermore, the electric power transmitting unit 68 positioned close to the rotating member 7 includes the DC outlet 62. Among these components, the DC outlet 62 delivers the electric power received from the pair of contact electrodes 64 to the reception-side device 66.

The configuration to be described below is employed as a configuration of the circuit for realizing communication between the reception-side device 66 and a transmission-side device 65 (corresponding to the fixed member-side device 55 illustrated in FIG. 23). Specifically, as illustrated in FIG. 24, a communication unit 67 positioned close to the fixed member 8 and a communication unit 67 positioned close to the rotating member 7 are provided.

Here, the communication unit 67 positioned close to the fixed member 8 includes a modular jack 60 (corresponding to the modular jack 51 positioned close to the bottom plate 19 illustrated in FIG. 23), a medium conversion module 63 (corresponding to the medium conversion unit 53 positioned close to the bottom plate 19 illustrated in FIG. 23), the DC outlet 62, and a coaxial connector 56. Among these components, the modular jack 60 receives signals from the transmission-side device 65. Moreover, the medium conversion module 63 is configured to convert the signals output from the modular jack 60 according to a predetermined communication protocol and includes a wireless LAN controller 57 that controls communication with the communication unit 67 positioned close to the rotating member 7, a cable LAN controller 59 that controls communication with the transmission-side device 65, and a CPU 58 that controls the medium conversion module 63. Moreover, the DC outlet 62 delivers the electric power supplied from the electric power source 55 to the medium conversion module 63. Furthermore, the coaxial connector 56 is connected to the inner conductor 9 of the fixed member 8 so as to deliver the signals converted by the medium conversion module 63 to the communication unit 67 positioned close to the rotating member 7. Furthermore, the communication unit 67 positioned close to the rotating member 7 includes the coaxial connector 56, the medium conversion module 63 (corresponding to the medium conversion unit 53 positioned close to the top plate 18 illustrated in FIG. 23), the modular jack 60 (corresponding to the modular jack 51 positioned close to the top plate 18 illustrated in FIG. 23), and a DC/DC converter 69. Among these components, the coaxial connector 56 is connected to the inner conductor 9 of the rotating member 7 so as to receive signals from the communication unit 67 positioned close to the fixed member 8. Moreover, the medium conversion module 63 is configured to convert the signals output from the coaxial connector 56 according to a predetermined communication protocol and includes the wireless LAN controller 57 that controls communication with the communication unit 67 positioned close to the fixed member 8, the cable LAN controller 59 that controls communication with the reception-side device 66, and the CPU 58 that controls the medium conversion module 63. Furthermore, the modular jack 60 transmits the signals converted by the medium conversion module 63 to the reception-side device 66. Furthermore, the DC/DC converter 69 converts a portion of the electric power delivered from the pair of contact electrodes 64 to a predetermined amount and supplies the converted electric power to the medium conversion module 63.

Due to this configuration, it is possible to perform contact power feeding and to perform communication wave-based communication using a general communication protocol.
(Configuration of Electric Power Supply System which Uses Independent Electrodes: Configuration which Uses General Communication Protocol: Configuration in which Non-Contact Power Feeding and Communication Wave-Based Communication are Performed)

Figure 25:
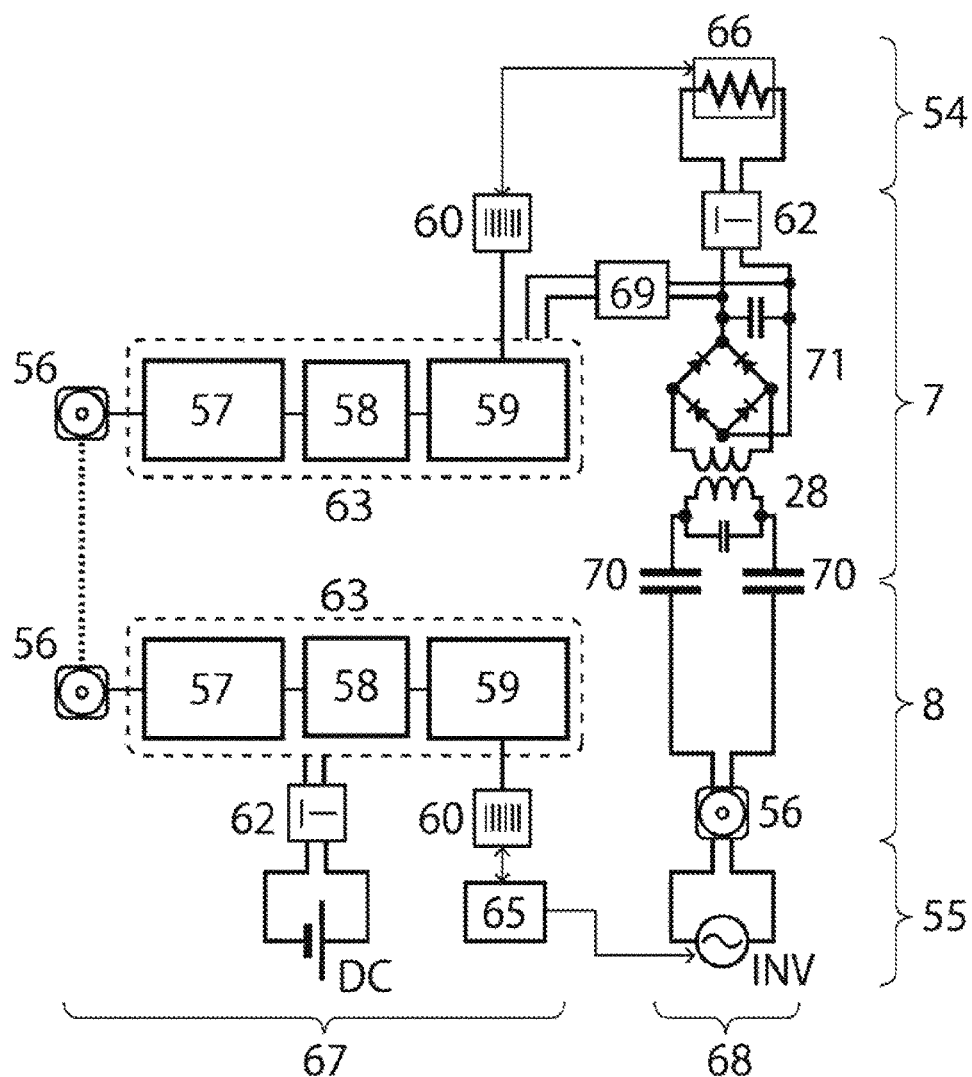
FIG. 25 is a diagram illustrating an example of a configuration of a circuit when an electric power supply system performs non-contact electric power feeding and communication wave-based communication.

Next, a configuration in which non-contact power feeding and communication wave-based communication are performed will be described. FIG. 25 is a diagram illustrating an example of a configuration of a circuit when an electric power supply system performs non-contact power feeding and communication wave-based communication.

The electric power supply system associated this configuration has substantially the same configuration as the electric power supply system illustrated in FIG. 23, except that the insulating DLC 35 is coated instead of the conductive DLC 36.

The circuit used in this electric power supply system has substantially the same configuration as the circuit illustrated in FIG. 24, except for the configuration to be described below. As illustrated in FIG. 25, as a specific example of the configuration of the circuit for transmitting electric power from the electric power source 55 (an AC electric power source) to the reception-side device 66, the electric power transmitting unit 68 positioned close to the fixed member 8, a pair of coupling capacitances 70 (corresponding to the rotating member-side ring electrode 1 and the fixed member-side ring electrode 2 illustrated in FIG. 23), and the electric power transmitting unit 68 positioned close to the rotating member 7 are provided.

Here, the electric power transmitting unit 68 positioned close to the fixed member 8 includes the coaxial connector 56. Among these components, the coaxial connector 56 receives electric power from the electric power transmitting unit 68 including the electric power source 55. Moreover, the pair of coupling capacitances 70 delivers the electric power received from the coaxial connector 56 to the electric power transmitting unit 68 positioned close to the rotating member 7. Moreover, the electric power transmitting unit 68 positioned close to the rotating member 7 includes the resonance circuit 28, a rectification and smoothing circuit 71, and the DC outlet 62. Among these components, the resonance circuit 28 delivers the electric power received from the pair of coupling capacitances 70 to the rectification and smoothing circuit 71 in a non-contacting manner. The rectification and smoothing circuit 71 rectifies the electric power received from the resonance circuit 28. Moreover, the DC outlet 62 delivers the electric power rectified by the rectification and smoothing circuit 71 to the reception-side device 66.

The configuration to be described below is employed as a configuration of the circuit for realizing communication between the transmission-side device 65 and the reception-side device 66. Specifically, as illustrated in FIG. 25, the communication unit 67 positioned close to the fixed member 8 and the communication unit 67 positioned close to the rotating member 7 are provided.

Here, the communication unit 67 positioned close to the fixed member 8 includes the modular jack 60, the medium conversion module 63, the DC outlet 62, and the coaxial connector 56. Moreover, the communication unit 67 positioned close to the rotating member 7 includes the coaxial connector 56, the medium conversion module 63, the modular jack 60, and the DC/DC converter 69. Among these components, the DC/DC converter 69 converts a portion of the electric power rectified by the rectification and smoothing circuit 71 to a predetermined amount and supplies the converted electric power to the medium conversion module 63.

Due to this configuration, it is possible to perform non-contact power feeding and to perform communication wave-based communication using a general communication protocol.
(Configuration of Electric Power Supply System which Uses Independent Electrodes: Configuration which Uses General Communication Protocol: Configuration in which Contact Power Feeding and Optical Communication are Performed)

Figure 26:
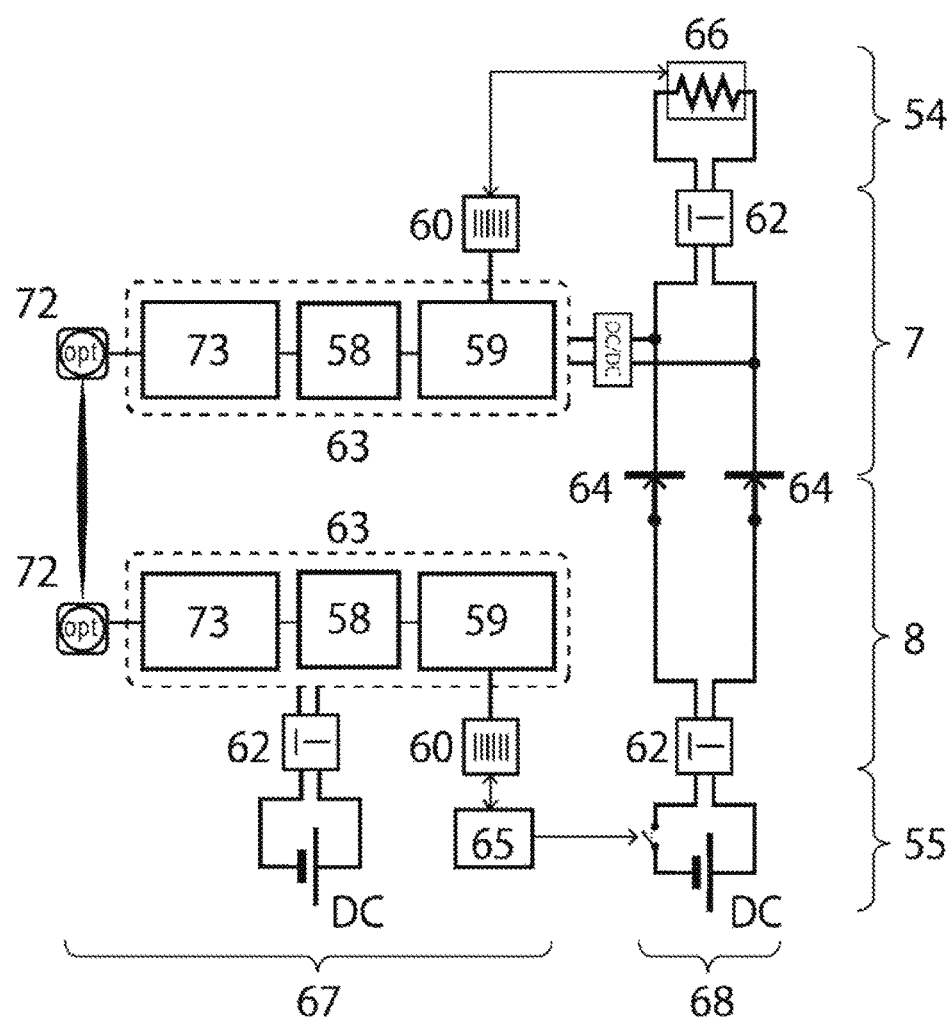
FIG. 26 is a diagram illustrating an example of a configuration of a circuit when an electric power supply system performs contact electric power feeding and performs optical communication.

Next, a configuration in which contact power feeding and optical communication are performed will be described. FIG. 26 is a diagram illustrating an example of a configuration of a circuit when an electric power supply system performs contact power feeding and optical communication.

The electric power supply system associated with this configuration has substantially the same configuration as the electric power supply system illustrated in FIG. 23, except that an optical waveguide (not illustrated) is provided instead of the inner conductor 9 of the rotating member 7 and the inner conductor 9 of the fixed member 8.

The circuit used in this electric power supply system has substantially the same configuration as the circuit illustrated in FIG. 23, except for the configuration to be described below. As illustrated in FIG. 26, as a specific example of the configuration for transmitting electric power from the electric power source 55 (the DC electric power source) to the reception-side device 66, the electric power transmitting unit 68 positioned close to the fixed member 8, the pair of contact electrodes 64, and the electric power transmitting unit 68 positioned close to the rotating member 7 are provided.

Here, the electric power transmitting unit 68 positioned close to the fixed member 8 includes the DC outlet 62. Moreover, the electric power transmitting unit 68 positioned close to the rotating member 7 includes the DC outlet 62.

The configuration to be described below is employed as the configuration of the circuit for realizing communication between the transmission-side device 65 and the reception-side device 66. Specifically, as illustrated in FIG. 26, the communication unit 67 positioned close to the fixed member 8 and the communication unit 67 positioned close to the rotating member 7 are provided.

Here, the communication unit 67 positioned close to the fixed member 8 includes the modular jack 60, the medium conversion module 63, the DC outlet 62, an electro-optical conversion unit (not illustrated), and an optical coupler 72. Among these components, the medium conversion module 63 includes an optical communication controller 73 that controls communication with the communication unit 67 positioned close to the rotating member 7, the cable LAN controller 59, and the CPU 58. Moreover, the electro-optical conversion unit converts an electrical signal output from the medium conversion module 63 to an optical signal. Furthermore, the optical coupler 72 splits one signal input from the electro-optical conversion unit into a plurality of signals or couples a plurality of input signals to one signal and transmits the same to the communication unit 67 positioned close to the rotating member 7. Furthermore, the communication unit 67 positioned close to the rotating member 7 includes the optical coupler 72, an opto-electric conversion unit (not illustrated), the medium conversion module 63, the modular jack 60, and the DC/DC converter 69. Among these components, the optical coupler 72 splits one signal input from the communication unit 67 positioned close to the fixed member 8 or couples a plurality of input signals to one signal and transmits the same to the medium conversion module 63. Moreover, the opto-electric conversion unit converts an optical signal output from the optical coupler 72 to an electrical signal. Furthermore, the medium conversion module 63 includes an optical communication controller 73 that controls communication with the communication unit 67 positioned close to the fixed member 8, the cable LAN controller 59, and the CPU 58.

Due to this configuration, it is possible to perform contact power feeding and to perform optical communication using a general communication protocol.

(Configuration of Electric Power Supply System which Uses Independent Electrodes: Configuration which Uses General Communication Protocol: Configuration in which Non-Contact Power Feeding and Optical Communication are Performed)

Figure 27:
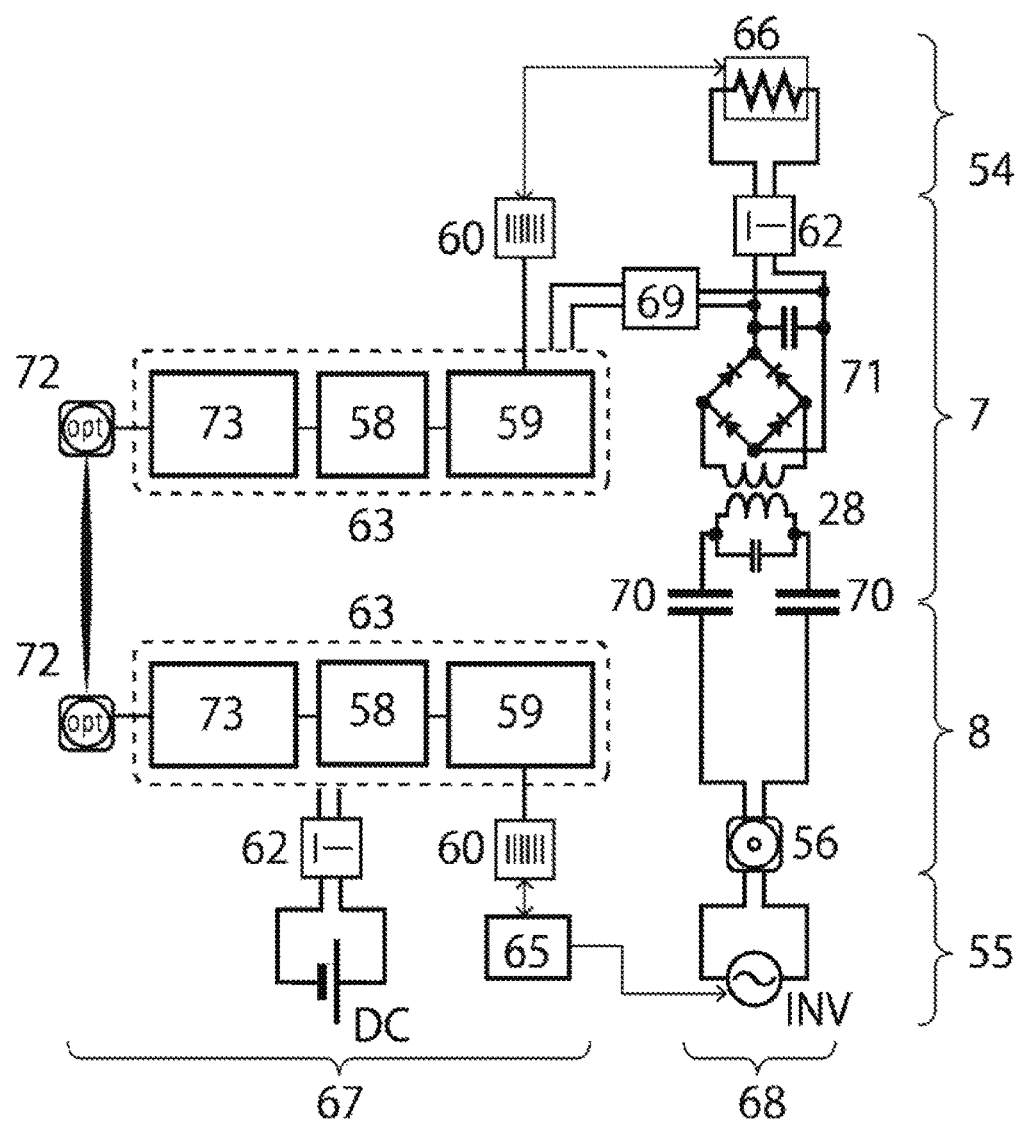
FIG. 27 is a diagram illustrating an example of a configuration of a circuit when an electric power supply system performs non-contact electric power feeding and performs optical communication.

Next, a configuration in which non-contact power feeding and optical communication are performed will be described. FIG. 27 is a diagram illustrating an example of a configuration of a circuit when an electric power supply system performs non-contact power feeding and optical communication.

An electric power supply system associated with this configuration has substantially the same configuration as the electric power supply system illustrated in FIG. 23, except that an optical waveguide (not illustrated) is provided instead of the inner conductor 9 of the rotating member 7 and the inner conductor 9 of the fixed member 8.

The circuit used in this electric power supply system has substantially the same configuration as the circuit illustrated in FIG. 24, except for the configuration to be described below. As illustrated in FIG. 27, as a specific example of the configuration of the circuit for transmitting electric power from the electric power source 55 (the AC electric power source) to the reception-side device 66, the electric power transmitting unit 68 positioned close to the fixed member 8, a pair of coupling capacitances 70, and the electric power transmitting unit 68 positioned close to the rotating member 7 are provided.

Here, the electric power transmitting unit 68 positioned close to the fixed member 8 includes the coaxial connector 56. Moreover, the electric power transmitting unit 68 positioned close to the rotating member 7 includes the resonance circuit 28, the rectification and smoothing circuit 71, and the DC outlet 62.

The configuration to be described below is employed as a configuration of the circuit for realizing communication between the transmission-side device 65 and the reception-side device 66. Specifically, as illustrated in FIG. 27, the communication unit 67 positioned close to the fixed member 8 and the communication unit 67 positioned close to the rotating member 7 are provided.

Here, the communication unit 67 positioned close to the fixed member 8 includes the modular jack 60, the medium conversion module 63, the DC outlet 62, an electro-optical conversion unit (not illustrated), and an optical coupler 72. Among these components, the medium conversion module 63 includes an optical communication controller 73 that controls communication with the communication unit 67 positioned close to the rotating member 7, the cable LAN controller 59, and the CPU 58. Furthermore, the communication unit 67 positioned close to the rotating member 7 includes the optical coupler 72, an opto-electric conversion unit (not illustrated), the medium conversion module 63, the modular jack 60, and the DC/DC converter 69. Among these components, the medium conversion module 63 includes an optical communication controller 73 that controls communication with the communication unit 67 positioned close to the rotating member 7, the cable LAN controller 59, and the CPU 58.

Due to this configuration, it is possible to perform non-contact power feeding and to perform optical communication using a general communication protocol.

(Configuration of Electric Power Supply System which Uses Independent Electrodes: Configuration Capable of Blowing Air)

Next, a configuration capable of blowing air will be described. The electric power supply systems illustrated in FIGS. 7A to 7C to FIG. 27 are systems which having a power transmission function and a communication function only. A configuration having an air blowing function in addition to these functions will be described below.

Figure 28:
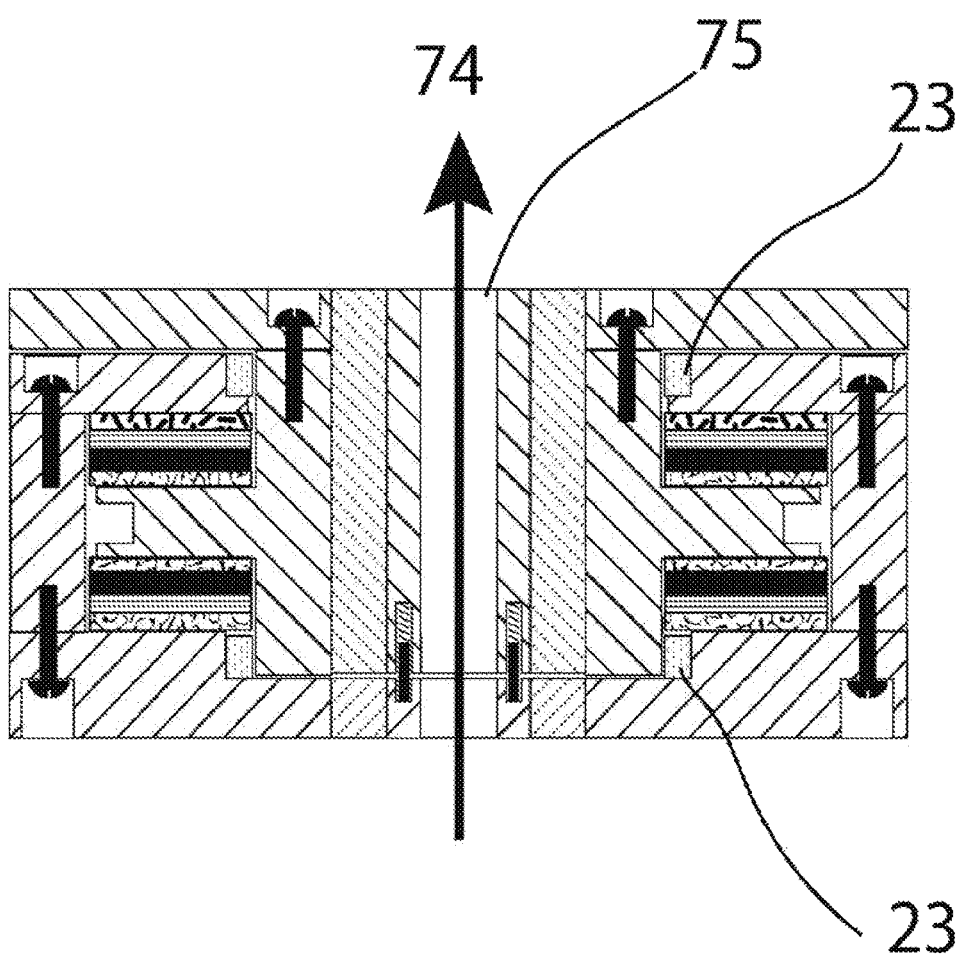
FIG. 28 is a cross-sectional view illustrating a configuration of an electric power supply system which uses independent electrodes.
Figure 29:
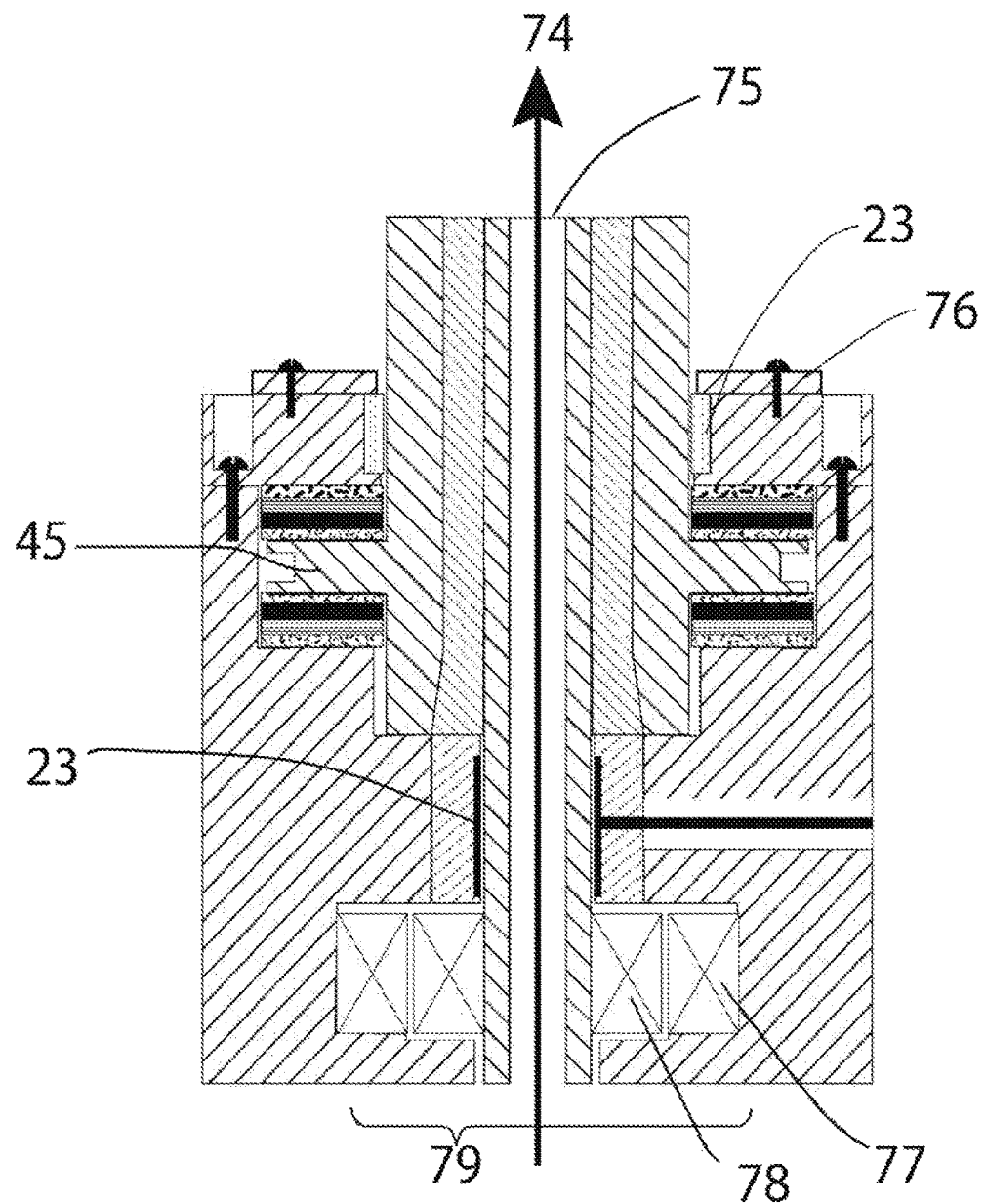
FIG. 29 is a cross-sectional view illustrating a configuration of an electric power supply system which uses independent electrodes.

FIGS. 28 and 29 are cross-sectional views illustrating a configuration of an electric power supply system which uses independent electrodes.

Figure 15:
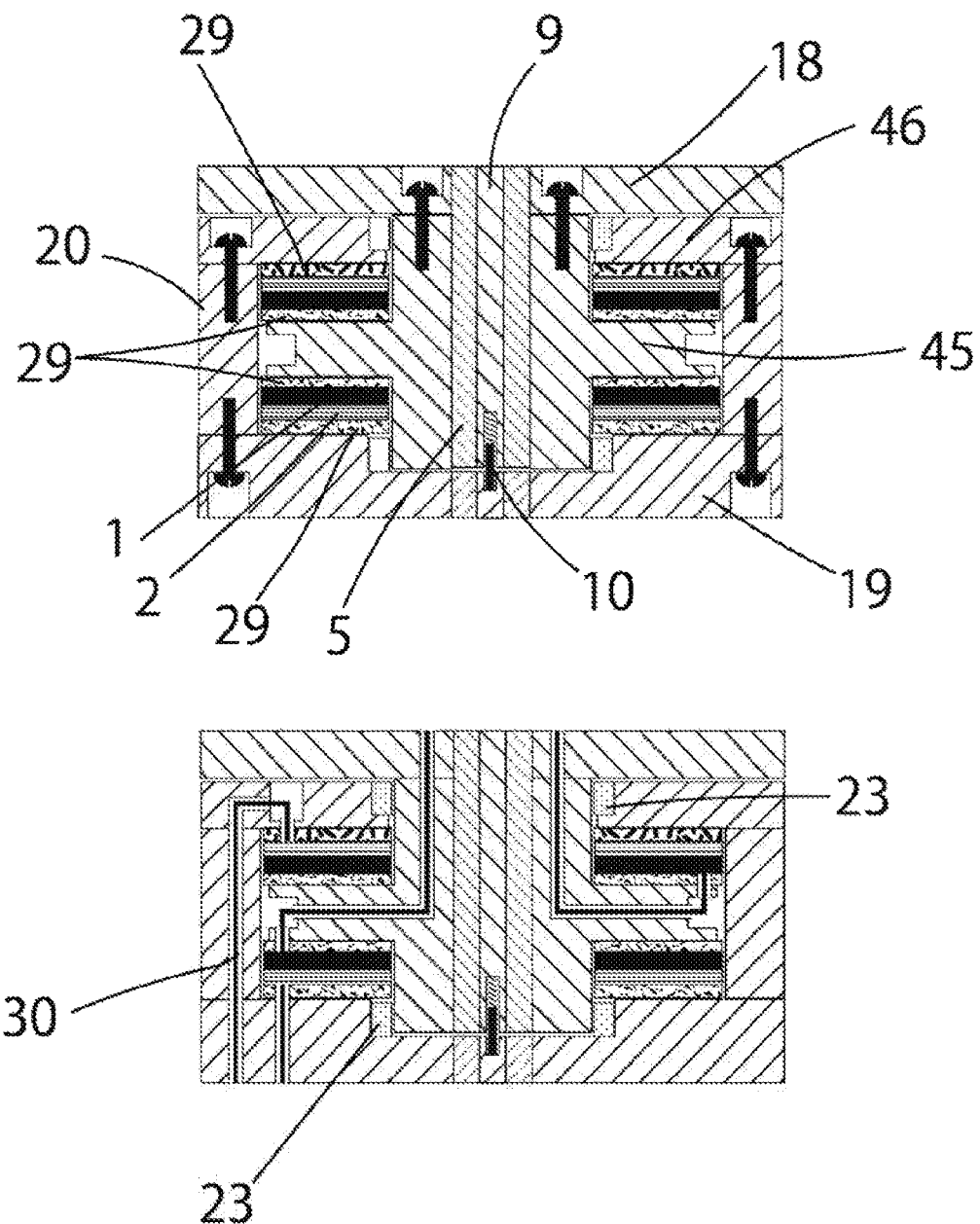
FIG. 15 is a cross-sectional view illustrating a configuration of an electric power supply system which uses independent electrodes.
Figure 16:
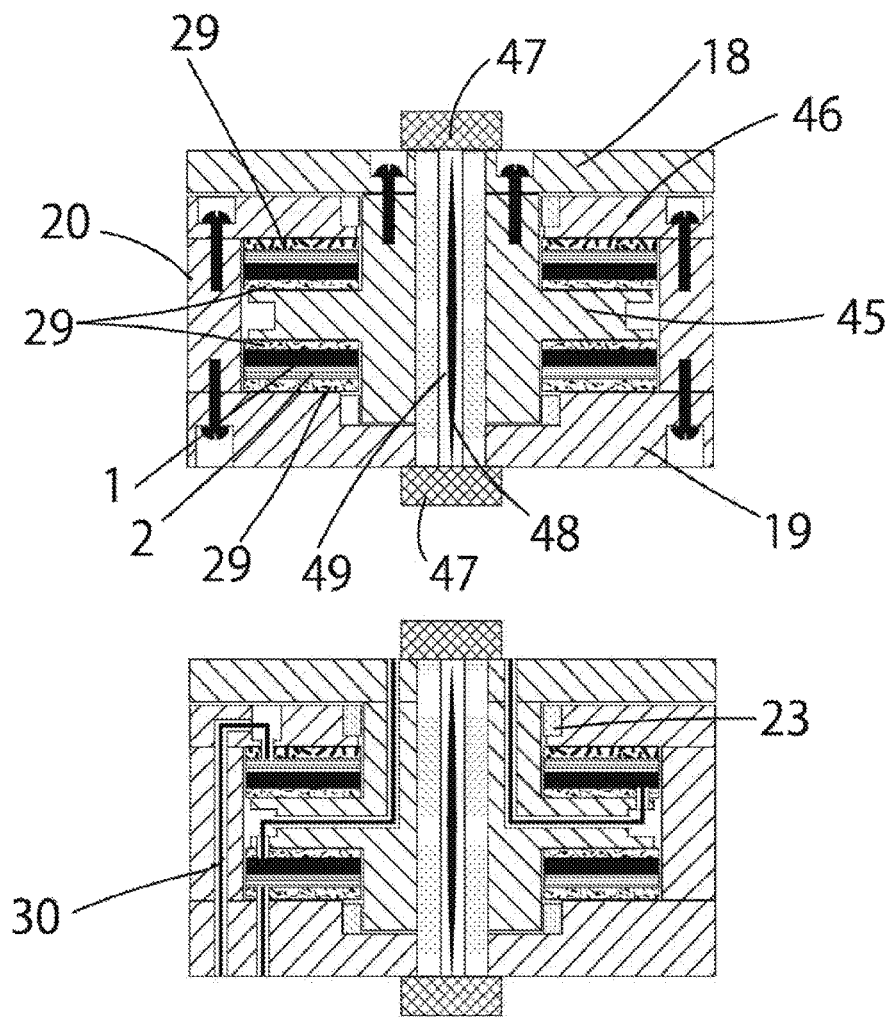
FIG. 16 is a cross-sectional view illustrating a configuration of an electric power supply system which uses independent electrodes.

First, the electric power supply system illustrated in FIG. 28 has substantially the same configuration as the electric power supply system illustrated in FIG. 15, except that the inner conductor 9 of the fixed member 8 and inner conductor 9 of the rotating member 7 are formed in a long cylindrical shape instead of a long rod shape. Due to this configuration, in addition to the power transmission function and the communication function, since air such as dry air 74 or light can be blown toward the rotating member 7 from the fixed member 8 through a hollow portion 75 of the inner conductor 9 of the fixed member 8 and a hollow portion 75 of the inner conductor 9 of the rotating member 7, it is possible to further improve the usability of the electric power supply system.

The electric power supply system illustrated in FIG. 29 has substantially the same configuration as the electric power supply system illustrated in FIG. 28, except for the configuration to be described below. Specifically, a hollow motor 79 is provided in the bottom plate 19. Here, the hollow motor 79 is configured to rotate the inner conductor 9 of the fixed member 8 and inner conductor 9 of the rotating member 7 and includes a rotator 78 and a stator 77. Among these components, the rotator 78 is a portion which rotates together with the inner conductor 9 of the fixed member 8 and inner conductor 9 of the rotating member 7 and is disposed so that the inner conductor 9 of the fixed member 8 is inserted into a through-hole formed in the rotator 78 and is attached to the inner conductor 9 of the fixed member 8 by a fixing tool or the like. Moreover, the stator 77 is a portion which generates force for rotating a rotor and is disposed to cover an outer edge of the rotator 78 and is fixed to the bottom plate 19 by a fixing tool or the like. In this case, a portion of the inner conductor 9 of the fixed member 8, which is not inserted in the rotator 78 makes partial contact with the high-frequency conductive path dielectric 5 of the fixed member 8 with the sliding bearing 23 interposed therebetween. Moreover, the inner conductor 9 of the rotating member 7 and the inner conductor 9 of the fixed member 8 are formed integrally. Due to this configuration, when the hollow motor 79 is provided, in addition to the power transmission function and the communication function, air such as the dry air 74 or light can be blown toward the rotating member 7 from the fixed member 8 through the hollow portion 75 formed in the inner conductor 9 of the fixed member 8 and the hollow portion 75 formed in the inner conductor 9 of the rotating member 7.

Modification for the Embodiments

While the respective embodiments according to the present invention have been described above, the specific configurations and means of the present invention can be arbitrarily modified and improved without departing from the technical concepts of the inventions defined in the appended claims. Hereinafter, such a modification will be described.

Problems to be Solved and Effects of the Invention

First, problems to be solved by the invention and effects of the invention are not limited to those described above, and may be different depending on the environment where the invention is carried out and the details of configurations. In some cases, only some of the above-described problems are solved, and only some of the above-described effects are obtained. Even when power transmission efficiency is decreased lower than a conventional system, when the means of the present invention is different from the means of the conventional system, the problems to be solved by the present invention are solved.
(Shape, Numerical Value, Structure, and Time Sequence)

The shapes and the numerical values of constituent elements illustrated in the embodiments and the drawings or the mutual relationships between the structures or time sequences of the plurality of constituent elements may be arbitrarily modified and improved without departing from the technical concepts of the present invention.
(Electric Power Source and Load)

In the above-described embodiment, although the electric power source has been described as being connected to the fixed member 8 and the load has been described as being connected to the rotating member 7, the present invention is not limited to this, and for example, the electric power source may be connected to the rotating member 7 and the load may be connected to the fixed member 8.
(Fixed Member)

In the above-described embodiment, although the fixed member 8 has been described as being fixed to be non-rotatable, the fixed member 8 may rotate at a lower rotation speed than the rotating member 7, for example.

(Communication Protocol)

Figure 20:
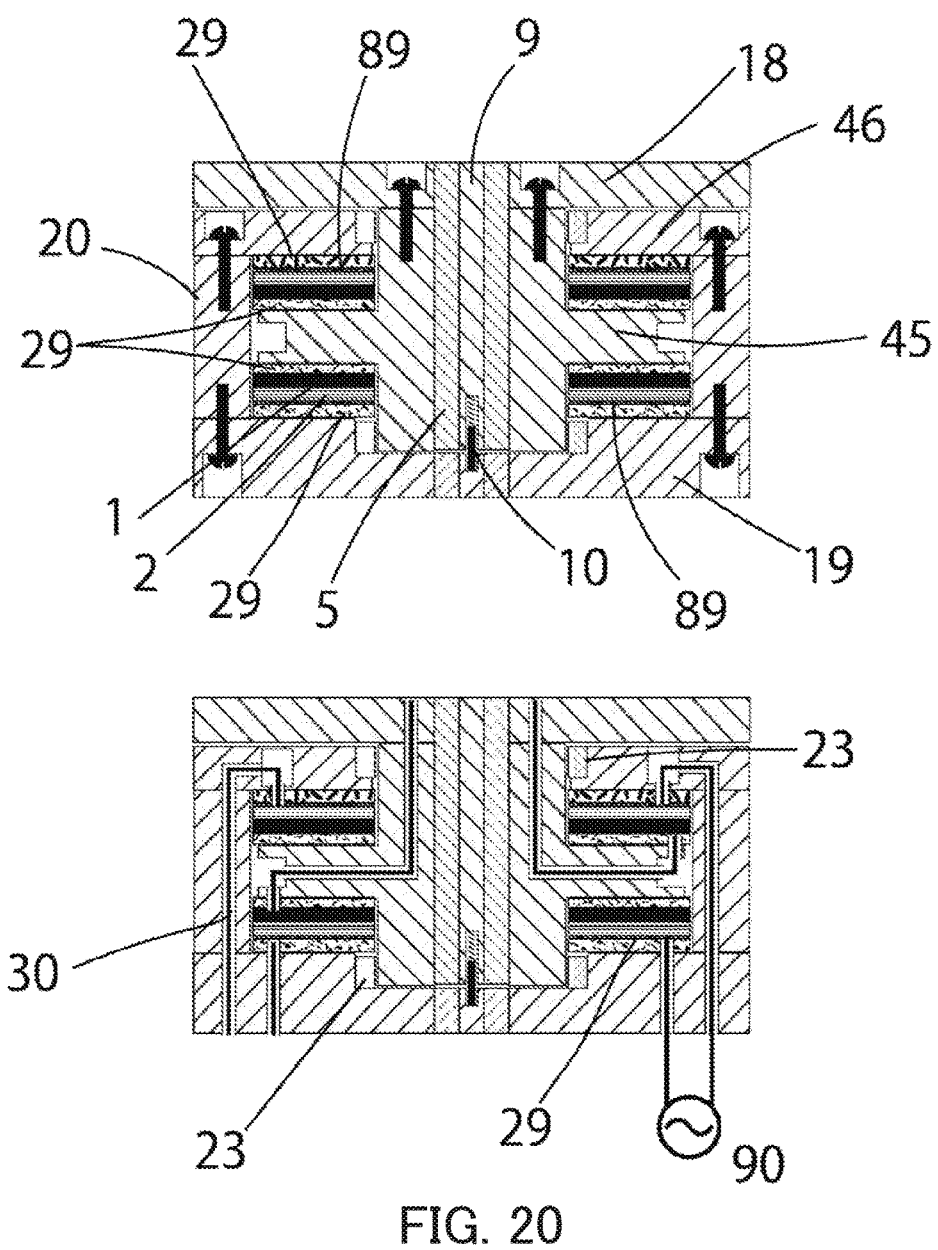
FIG. 20 is a cross-sectional view illustrating a configuration of an electric power supply system which uses independent electrodes.

In the above-described embodiment, in the electric power supply system illustrated in FIG. 20, although it has been described that the modular jack 51 is used, the present invention is not limited to this, and a terminal of another communication protocol may be used. For example, a USB terminal, a terminal compatible with the IEEE-1394 protocol, a terminal compatible with a video protocol, or a terminal compatible with an audio protocol may be used.
(Supplementary Notes)

An electric power supply system according to supplementary note 1 is an electric power supply system that supplies electric power from an electric power source to a predetermined load via a first shaft and a second shaft that is rotatable in relation to the first shaft, wherein the first shaft includes: a first inner shaft conductor disposed along an axial direction of the first shaft; a first outer shaft conductor disposed so as to cover the first inner shaft conductor along the axial direction of the first shaft; and a first shaft insulator disposed between the first inner shaft conductor and the first outer shaft conductor, the second shaft includes: a second inner shaft conductor disposed along an axial direction of the second shaft; a second outer shaft conductor disposed so as to cover the second inner shaft conductor along the axial direction of the second shaft; and a second shaft insulator disposed between the second inner shaft conductor and the second outer shaft conductor, the electric power source, the first outer shaft conductor, the second outer shaft conductor, and the load are electrically connected so that electric power can be supplied from the electric power source to the load, and the first shaft and the second shaft are combined to form an electromagnetic wave attenuation structure for reducing electromagnetic waves radiating from the electric power supply system.

An electric power supply system according to supplementary note 2 is the electric power supply system according to supplementary note 1, in which the electromagnetic wave attenuation structure is formed as a cover structure in which at least a portion of the second outer shaft conductor is covered by the first outer shaft conductor so that portions to which the first outer shaft conductor and the second outer shaft conductor are electrically connected are not exposed to the outside.

An electric power supply system according to supplementary note 3 is the electric power supply system according to supplementary note 1, in which the electromagnetic wave attenuation structure is formed as a contact structure in which the first outer shaft conductor and the second outer shaft conductor make contact with each other so that a conductive property of the first outer shaft conductor and the second outer shaft conductor can be secured.
(Effects of Supplementary Notes)

According to the electric power supply system of supplementary note 1, the first shaft includes the first inner shaft conductor disposed along the axial direction of the first shaft, the first outer shaft conductor disposed so as to cover the first inner shaft conductor along the axial direction of the first shaft, and the first shaft insulator disposed between the first inner shaft conductor and the first outer shaft conductor, the second shaft includes the second inner shaft conductor disposed along the axial direction of the second shaft, the second outer shaft conductor disposed so as to cover the second inner shaft conductor along the axial direction of the second shaft, and the second shaft insulator disposed between the second inner shaft conductor and the second outer shaft conductor, and the electric power source, the first outer shaft conductor, the second outer shaft conductor, and the load are electrically connected so that electric power can be supplied from the electric power source to the load. Therefore, when electric field coupling is realized by the first inner shaft conductor and the second inner shaft conductor, the effects to be described below are obtained. Specifically, since the first inner shaft conductor and the second inner shaft conductor do not make contact with each other, the maintenance of the first inner shaft conductor and the second inner shaft conductor is not necessary or a maintenance interval can be extended. Moreover, even when water enters into the first shaft or the second shaft, the first inner shaft conductor and the second inner shaft conductor can be used without any problem (particularly, since water is a ferroelectric material having a relative dielectric constant of 80, it is possible to strengthen the coupling force by electric field). Therefore, since a design which allows entrance of water can be provided, the manufacturing cost can be reduced. Moreover, a decrease in power transmission efficiency can be suppressed even when the second shaft rotates at a high speed. Furthermore, since the first inner shaft conductor is covered by the first shaft insulator and the second inner shaft conductor is covered by the second shaft insulator, it is possible to prevent deterioration of the first inner shaft conductor and the second inner shaft conductor as long as these shaft insulators have acid and alkali resistance. Furthermore, since the first shaft and the second shaft are combined to form the electromagnetic wave attenuation structure for reducing the electromagnetic waves radiating from the electric power supply system, it is possible to reduce the electromagnetic waves radiating from the electric power supply system toward the outside and to improve the safety.

According to the electric power supply system of supplementary note 2, the electromagnetic wave attenuation structure is formed as the cover structure in which at least a portion of the second outer shaft conductor is covered by the first outer shaft conductor so that portions to which the first outer shaft conductor and the second outer shaft conductor are electrically connected are not exposed to the outside. Therefore, it is possible to form the cover structure easily and to improve the manufacturing property and to further reduce the manufacturing cost.

According to the electric power supply system of supplementary note 3, the electromagnetic wave attenuation structure is formed as the contact structure in which the first outer shaft conductor and the second outer shaft conductor make contact with each other so that a conductive property of the first outer shaft conductor and the second outer shaft conductor can be secured. Therefore, it is possible to form the contact structure easily and to improve the manufacturing property and to further reduce the manufacturing cost.

EXPLANATION OF REFERENCE NUMERALS

1: Rotating member-side ring electrode
2: Fixed member-side ring electrode
3: Rotating member-side ring electrode-fixing insulating pedestal
4: Fixed member-side ring electrode-fixing insulating pedestal (elastic)
5: High-frequency conductive path dielectric
6: Bearing portion
7: Rotating member
8: Fixed member
9: Inner conductor
10: Conductive rotary joint pin
11: Extrusion spring
12: Rotary joint
13: Outer conductor
14: High-frequency input and output port
15: Power port
16: Bearing washer
17: Rolling member
18: Top plate
19: Bottom plate
20: Cylinder body
21: Motor
22: Shaft fixing portion
23: Sliding bearing
24: Transceiver
25: DC electric power source
26: Load
27: High-frequency electric power source
28: Resonance circuit
29: Ring electrode-crimping elastic plate
30: Lead wire
31: Leakage electromagnetic wave
32: Plastic metal
33: Band with spring
34: Fixing bolt
35: Insulating DLC
36: Conductive DLC
37: Conductive brush
38: Rubber bushing
39: Needle-shaped roller bearing
40: Bearing inner ring
41: Bearing outer ring
43: Base
44: Fixing bolt
45: Flange shaft
46: Pressing bracket
47: Optical coupler
48: Light beam
49: Optical waveguide
50: Assumed stress
51: Modular jack
52: DC electric power source socket
53: Medium conversion unit
54: Rotating member-side device
55: Fixed member-side device, Electric power source
56: Coaxial connector
57: Wireless LAN controller
58: CPU
59: Cable LAN controller
60: Modular jack
62: DC outlet
63: Medium conversion module
64: Contact electrode
65: Transmission-side device
66: Reception-side device
67: Communication unit
68: Electric power transmitting unit
69: DC/DC converter
70: Coupling capacitance
71: Rectification and smoothing circuit
72: Optical coupler
73: Optical communication controller
74: Dry air
75: Hollow portion
77: Stator
78: Rotator
79: Hollow motor
80: Terminating resistor
81: O-ring 82: Heat-shrinkable resin cover
83: Fixed member-side bearing washer
84: Rotating member-side bearing washer
85: Fixing screw with spring
86: Cut portion
87: Contact interface
88: Rotary encoder
89: Piezoelectric ceramic element
90: Electric power source for piezoelectric element

The invention claimed is:

1. An electric power supply system that supplies electric power from an electric power source to a predetermined load via a first shaft and a second shaft that is rotatable in relation to the first shaft, wherein
the first shaft includes:
a first inner shaft conductor disposed along an axial direction of the first shaft;
a first outer shaft conductor disposed so as to cover the first inner shaft conductor along the axial direction of the first shaft; and
a first shaft insulator disposed between the first inner shaft conductor and the first outer shaft conductor,
the second shaft includes:
a second inner shaft conductor disposed along an axial direction of the second shaft;
a second outer shaft conductor disposed so as to cover the second inner shaft conductor along the axial direction of the second shaft; and
a second shaft insulator disposed between the second inner shaft conductor and the second outer shaft conductor,
the electric power source, the first outer shaft conductor, the second outer shaft conductor, and the load are electrically connected so that electric power can be supplied from the electric power source to the load, and
the first shaft and the second shaft are combined to form an electromagnetic wave attenuation structure for reducing electromagnetic waves radiating from the electric power supply system.

2. The electric power supply system according to claim 1, wherein
the electromagnetic wave attenuation structure is formed as a cover structure in which at least a portion of the second outer shaft conductor is covered by the first outer shaft conductor so that portions to which the first outer shaft conductor and the second outer shaft conductor are electrically connected are not exposed to the outside.

3. The electric power supply system according to claim 1, wherein
the electromagnetic wave attenuation structure is formed as a contact structure in which the first outer shaft conductor and the second outer shaft conductor make contact with each other so that a conductive property of the first outer shaft conductor and the second outer shaft conductor can be secured.

\* \* \* \* \*